United States Patent [19]

Matsumura

[11] Patent Number: 5,848,325

[45] Date of Patent: Dec. 8, 1998

[54] IMAGE FORMING APPARATUS

[75] Inventor: Keiichi Matsumura, Yokohama, Japan

[73] Assignee: Ricoh Company, Ltd., Tokyo, Japan

[21] Appl. No.: 841,572

[22] Filed: Apr. 30, 1997

[30] Foreign Application Priority Data

May 16, 1996 [JP] Japan ..................................... 8-121391

[51] Int. Cl.$^6$ ................................................. G03G 15/00
[52] U.S. Cl. ................................ 399/83; 399/45; 399/82; 358/296; 270/52.02; 382/306
[58] Field of Search .................... 399/82–84, 45, 399/366, 382, 403; 270/52.02, 52.03, 58.31, 58.04, 58.05; 358/296, 467; 382/30; 395/117

[56] References Cited

U.S. PATENT DOCUMENTS

| | | | |
|---|---|---|---|
| 3,804,005 | 4/1974 | Burger et al. | 270/58.02 |
| 4,757,348 | 7/1988 | Rourke et al. | 364/525 |
| 4,876,562 | 10/1989 | Suzuki et al. | 347/139 |
| 5,124,748 | 6/1992 | Tanabe et al. | 399/81 |
| 5,129,016 | 7/1992 | Murakami et al. | 358/403 X |
| 5,237,382 | 8/1993 | Matsumura . | |
| 5,243,381 | 9/1993 | Hube | 399/84 |
| 5,291,592 | 3/1994 | Kita | 395/117 |
| 5,316,279 | 5/1994 | Corona et al. | 270/1.01 |
| 5,506,697 | 4/1996 | Li et al. | 358/467 X |
| 5,640,647 | 6/1997 | Hube | 399/84 |
| 5,644,408 | 7/1997 | Li et al. | 358/467 X |
| 5,657,431 | 8/1997 | Plakosh et al. | 395/117 X |

FOREIGN PATENT DOCUMENTS 60-128462  7/1985  Japan .

*Primary Examiner*—Matthew S. Smith
*Attorney, Agent, or Firm*—Oblon, Spivak, McClelland, Maier & Neustadt, P.C.

[57] ABSTRACT

An image forming apparatus including plural paper sheet feeding trays and an operating panel to input information for setting of copying operations. An image memory and a reading and recording portion scan character(s) in a predetermined area of documents and store the character(s) in the image memory. Further, a sorting portion sorts the scanned documents based on the character(s), and an output portion outputs copied document based on the stored characters.

24 Claims, 35 Drawing Sheets

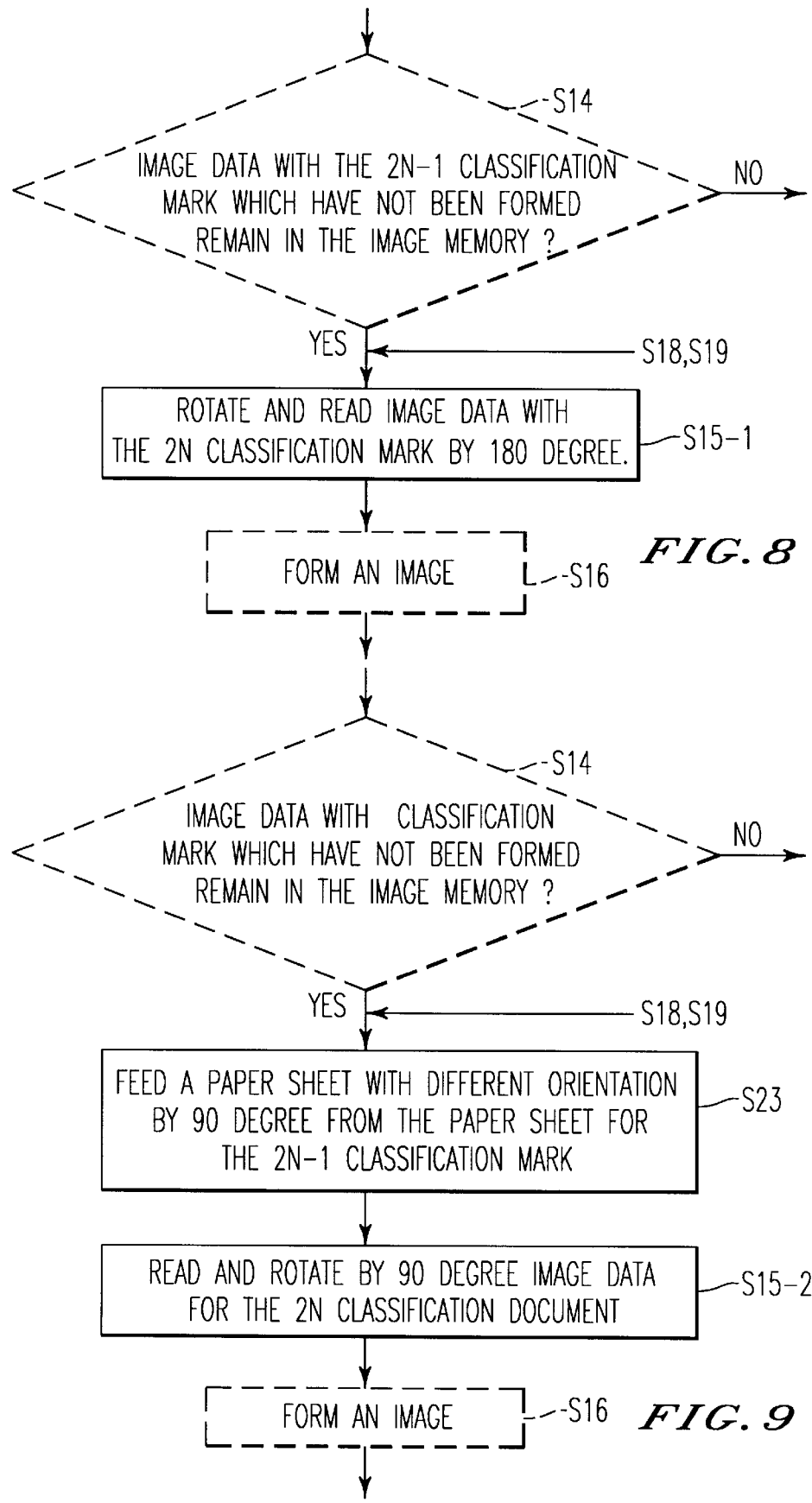

| DOCUMENT PAGE | RECOGNIZED RESULT (CLASSIFICATION NO.) |
|---|---|
| 1 | 0 |
| 2 | 0 |
| 3 | (A 1 0 1) |
| 4 | 0 |
| 5 | (A 1 0 2) |
| 6 | 0 |
| 7 | 0 |
| 8 | (A 1 0 3) |
| 9 | 0 |
| 10 | (A 1 0 2) |
| 11 | 0 |
| 12 | (A 1 0 3) |

*FIG. 13*

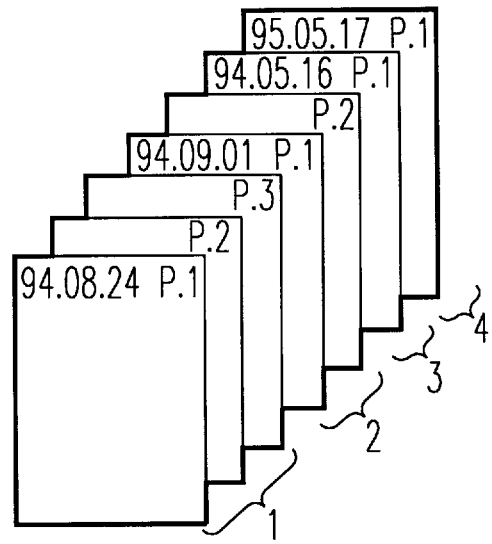
FIG. 36A
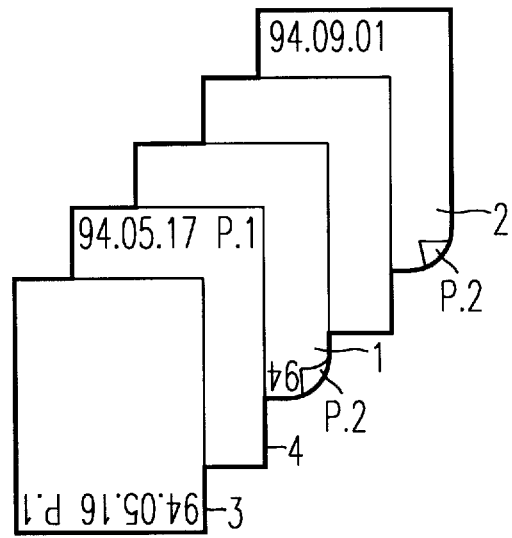
FIG. 36B

IMAGE FORMING APPARATUS

BACKGROUND OF THE INVENTION

1. Field of the Invention

The present invention is related to an image forming apparatus capable of forming images on a paper sheet from original image data.

2. Discussion of the Background

In a background image forming apparatus, such as a copier, settings for a copying operation are input using an input information displaying portion, and then the copying operation is executed.

When an "automatic paper sheet selecting mode" is selected, a copying operation is executed selecting a paper sheet of a same orientation and size as an original document to be copied. In a case that a "Sort mode" is selected, as shown in FIG. 12(F), each set of copied sheets is piled in a different position and separated from other sets of copied sheets by a paper discharging tray shifting to the right and left. Further, in a case of a "rotating sort" operation, as shown in FIG. 12(E), by selecting paper sheets of a same size but different orientations, each set of copied sheets and a scanned original document are adjusted (rotated) to the different orientations of the paper sheets.

FIG. 11 shows an example of an original document to be copied which includes five sets of sheet documents (1)–(5). As shown in FIG. 11, an original document (1) is marked with a classification mark A103, an original document (2) is marked with a classification mark A102, an original document (3) is marked with a classification mark A103, an original document (4) is marked with a classification mark A102, and an original document (5) is marked with a classification mark A101. The original documents are placed on a document feeding position at a same time and are copied.

In a case that a plural set of original documents marked with different marks (e.g., A101–A103) are copied at a same time, copied paper sheets are discharged in the order of the original documents placed on the document feeding position. Accordingly, as shown in FIG. 12(A), to sort the paper sheets discharged on the paper sheet discharging tray based on the classification, it is necessary to verify the classification marks manually, which causes the sorting operation to be complicated.

SUMMARY OF THE INVENTION

Accordingly, one object of the present invention is to provide a novel image forming apparatus capable of easily sorting plural sets of documents based on a classification mark.

Another object of the present invention is to provide a novel image forming apparatus in which the classification marks represent date data.

These and other objects of the present invention are accomplished by an image forming apparatus having plural paper sheet feeding trays and including an operating panel for inputting information for copying, an image memory, a reading and recording portion for scanning character(s) (e.g., classification marks) in a predetermined area of documents to be copied and storing the character(s) in the image memory, a sorting portion which sorts the scanned documents based on the read character(s), and an output portion for outputting copied paper sheets based on the read characters.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8 is a flowchart showing an operation according to an embodiment of the present invention;

FIG. 9 is a flow chart showing an operation according to an embodiment of the present invention;

FIG. 13 is an example of recognition results by a classification reading and recording portion according to an embodiment of the present invention;

FIGS. 36(A) and 36(B) are diagrams showing a state of a ream of documents and paper sheets which are discharged onto a discharging tray.

DESCRIPTION OF THE PREFERRED EMBODIMENTS

Figure 1:
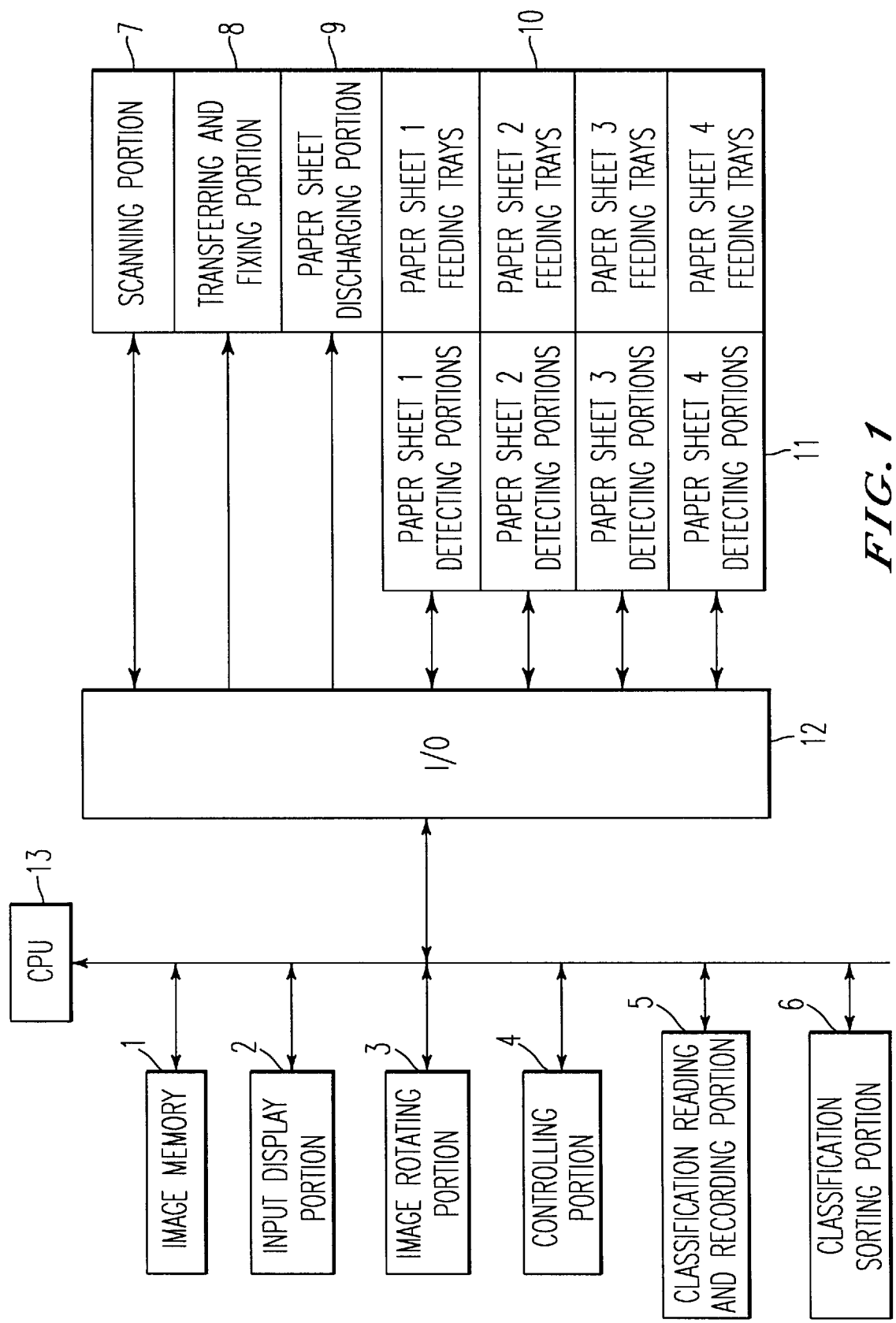
FIG. 1 a block diagram of an image forming apparatus according to an embodiment of the resent invention.

A description of the present invention will now be given below by referring to the following Figures, in which like reference numerals designate identical or corresponding parts throughout.

Embodiments of the present invention will now be explained first referring to FIGS. 1 to 5.

Figure 2:
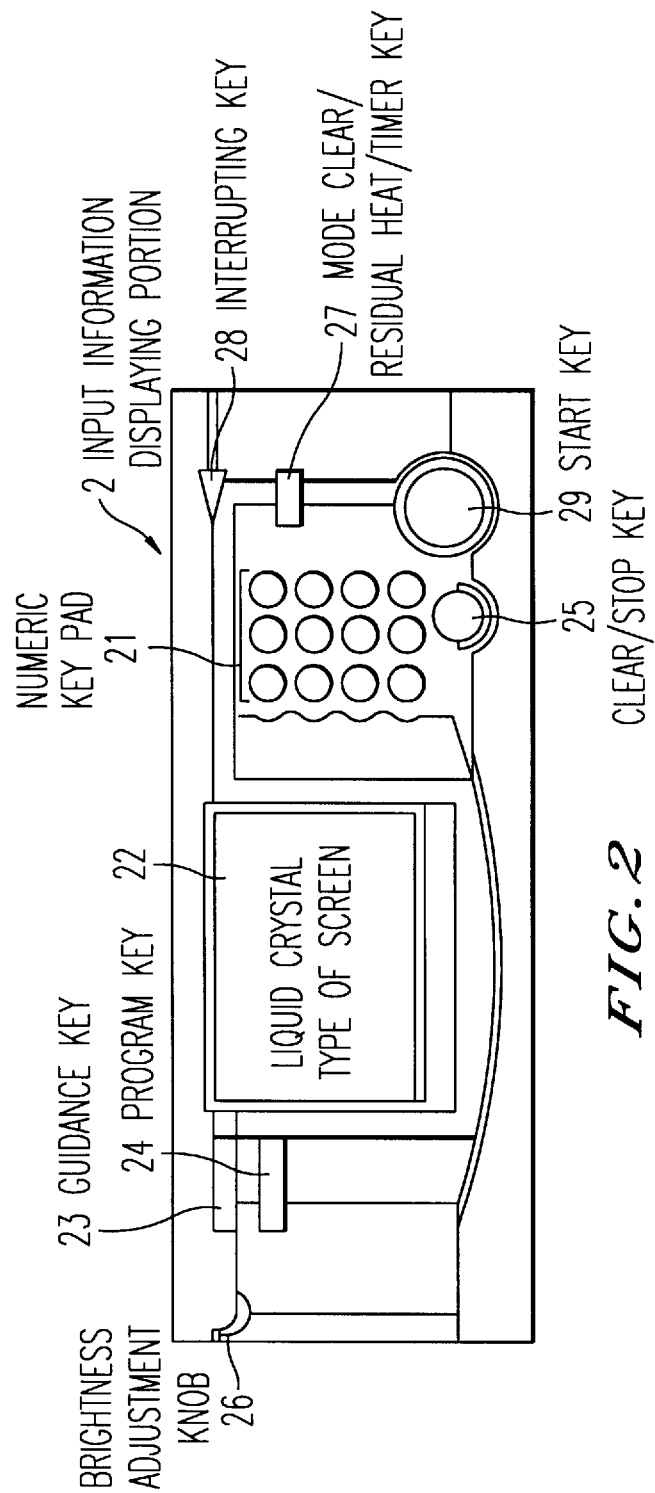
FIG. 2 shows an input information displaying portion according to an embodiment of the present invention.
Figure 3:
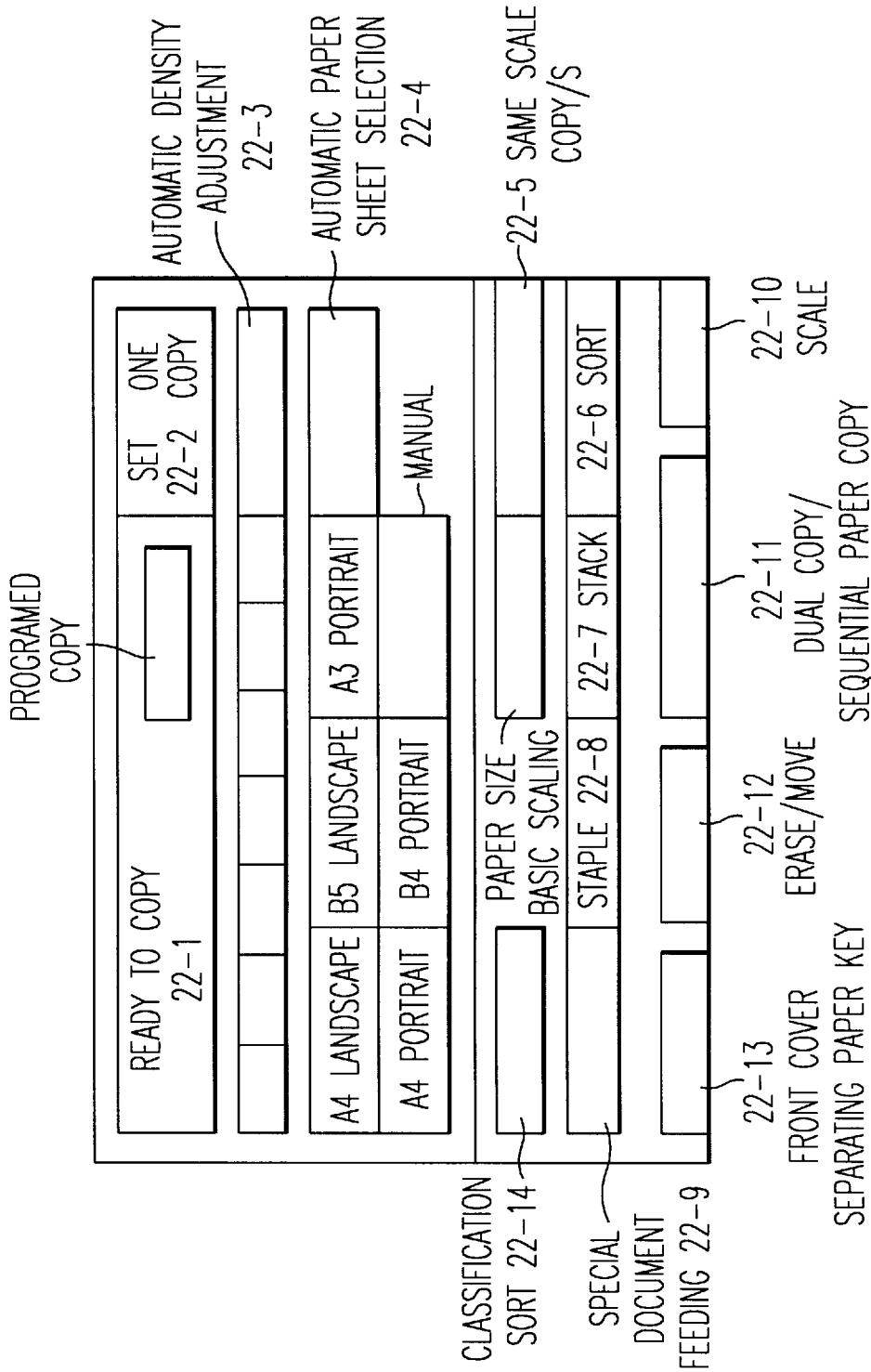
FIG. 3 shows a screen of a display according to an embodiment of the present invention.
Figure 4A:
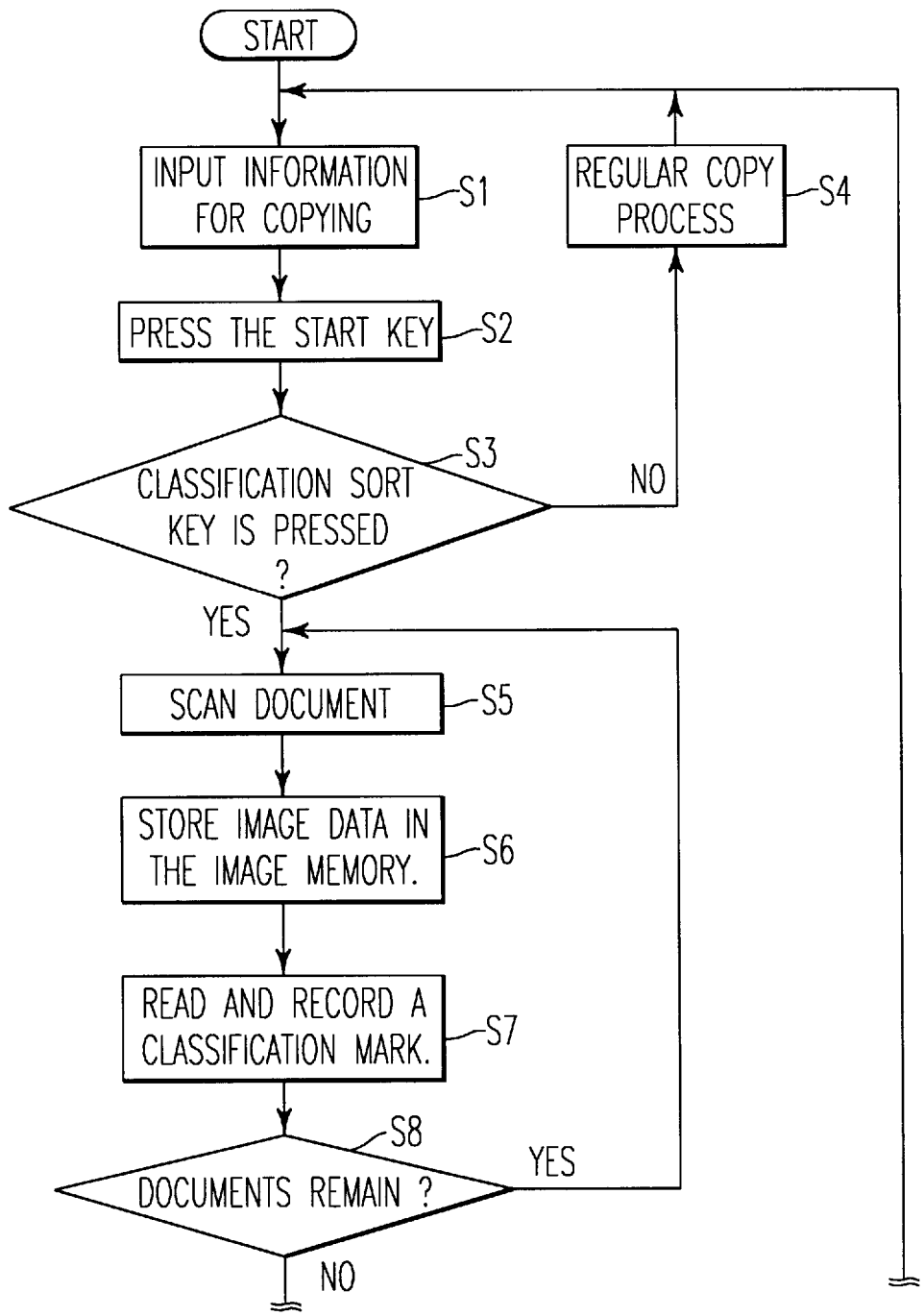
FIG. 4 is a flowchart showing an operation according to an embodiment of the present invention.
Figure 4B:
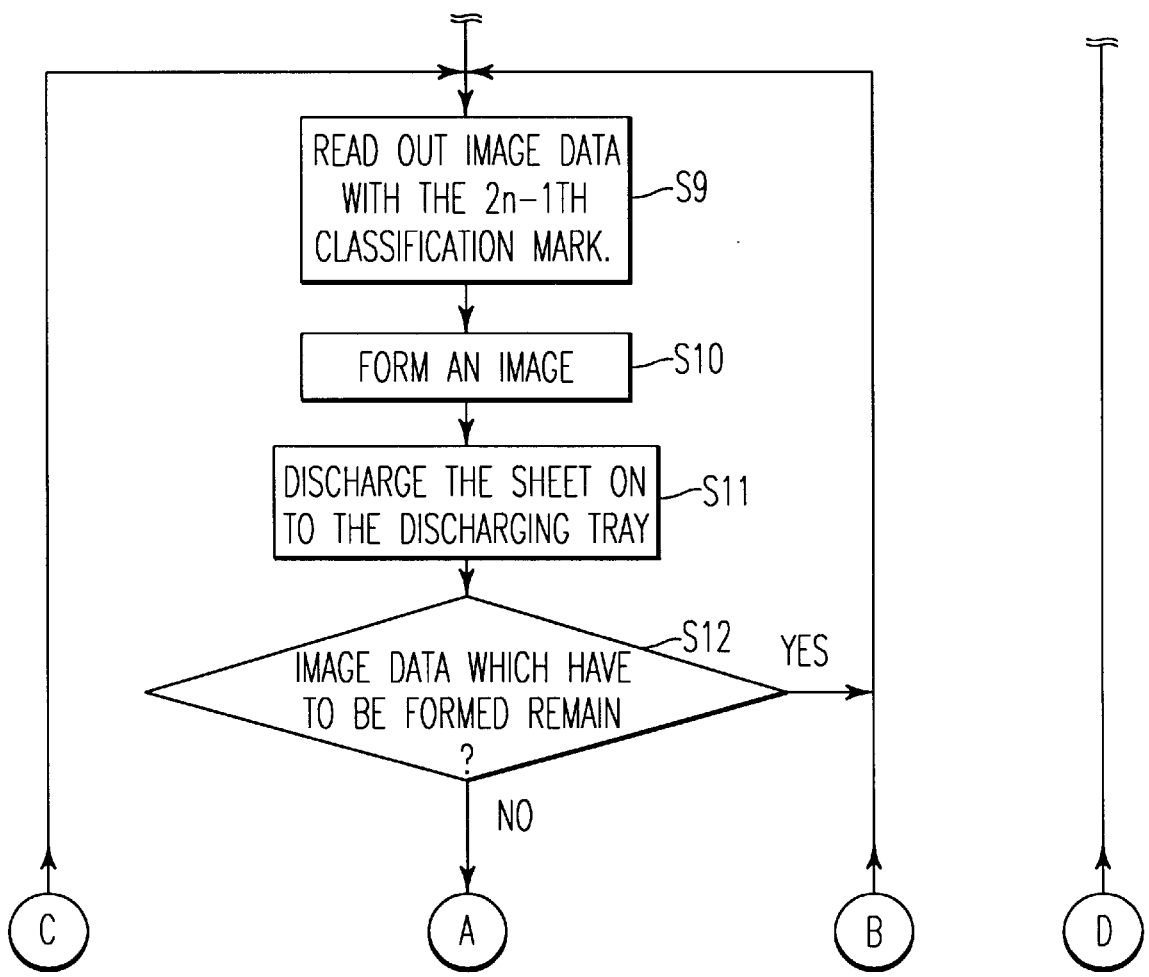
Figure 5A:
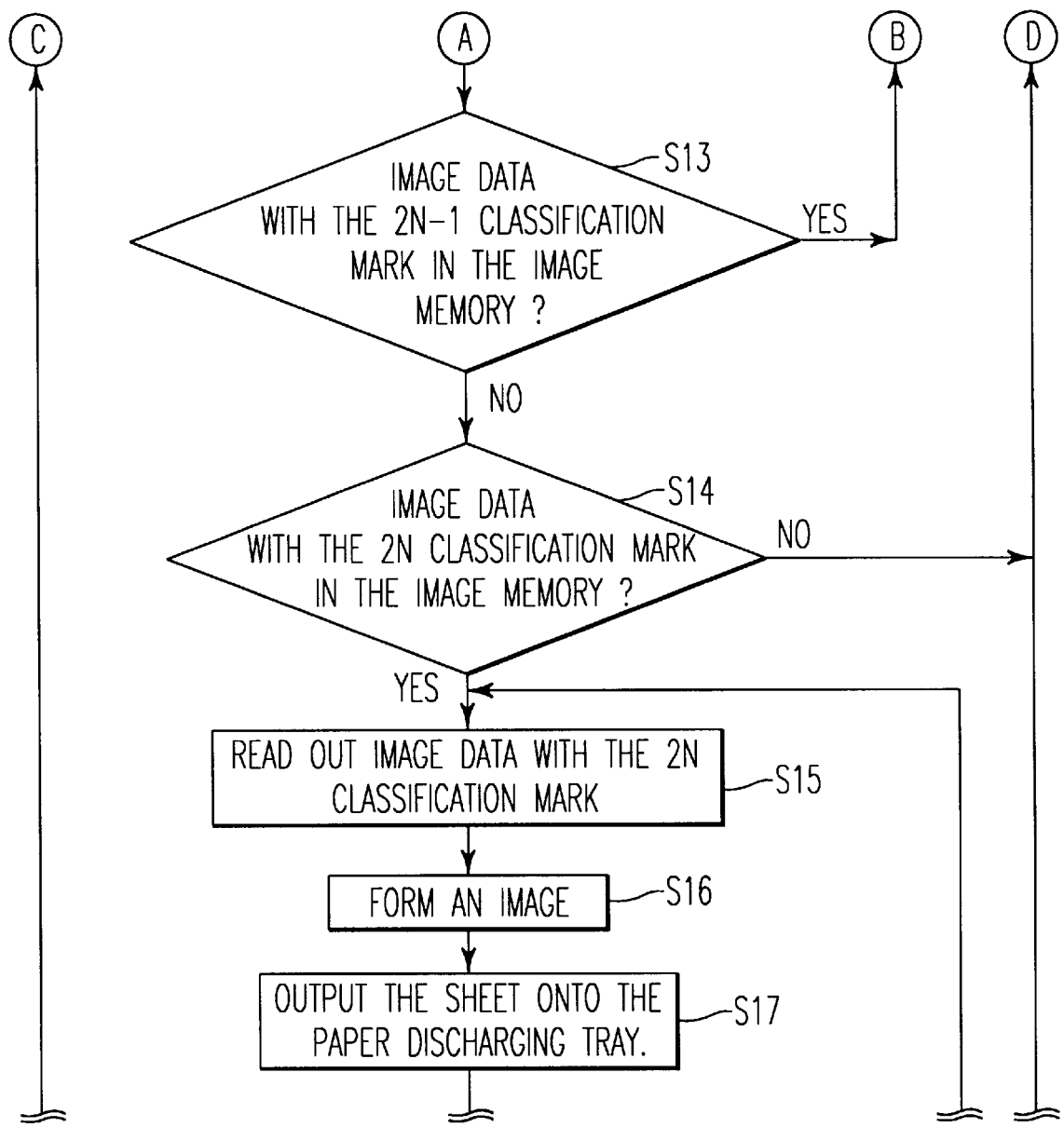
FIG. 5 is a flowchart showing an operation according to an embodiment of the present invention.
Figure 5B:
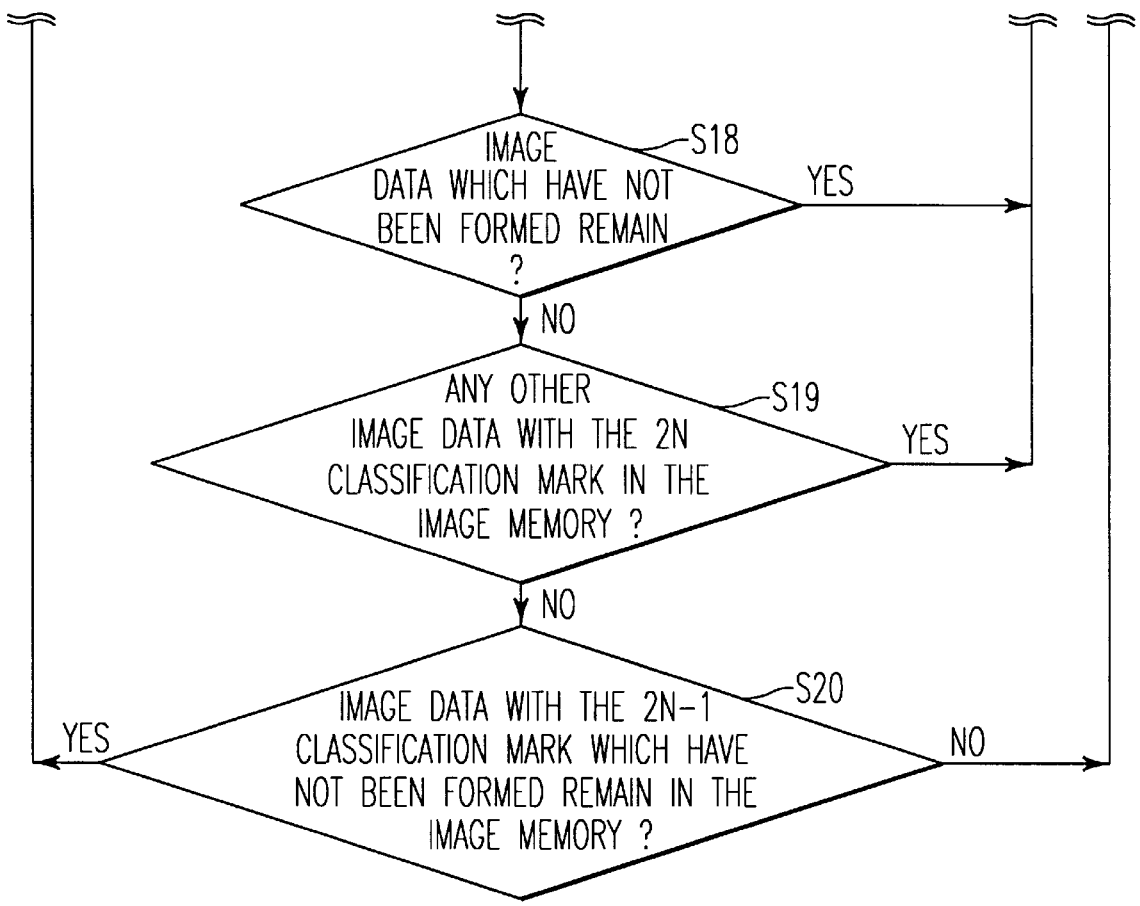

FIG. 1 is a block diagram showing an embodiment of an image forming apparatus according to the present invention. FIG. 2 shows an input display portion of the embodiment of FIG. 1. FIG. 3 is a diagram showing a display portion of the input display portion. FIGS. 4 and 5 are flowcharts showing an operation according to the embodiment of FIGS. 1–3.

As shown in FIG. 1, the image forming apparatus includes an image memory 1 to store image data of an original document which is converted into digital data after scanning, an input information display portion 2, an image rotating portion 3 which rotates original image data stored in the image memory when transferring an image onto a paper sheet, a controlling portion 4, a classification reading and recording portion 5, a classification sorting portion 6, a scanning portion 7 for scanning the original documents, a transferring and fixing portion 8, a paper discharging tray 9, a paper feeding tray section 10, a paper sheet detecting portion 11 an interface (I/O) 12, and a processor 13 (CPU) which processes data.

The input information displaying portion 2 is shown in greater detail in FIG. 2, and includes a numeric keypad 21 for inputting a number of copies to be made, a display 22, such as a liquid crystal type of screen, for displaying a status of an operation, messages, etc., a guidance key 23 for proceeding to a mode for displaying functions or operations, a program key 24 for setting a program operation, a clear/stop key 25 for correcting an input error or suspending an operation, a brightness adjustment knob 26 for adjusting a brightness of the display 22 (e.g. a touch panel), a mode clear/residual heat/timer key 27, an interrupting key 28 for inputting a starting command of an interrupting operation, and a start key 29 for starting a copying operation.

Further, the display 22, as shown in greater detail in FIG. 3, includes a message area 22-1 for displaying massages such as "Ready to copy" or "Wait", etc., a copy number displaying portion 22-2 for displaying an input number of copies to be made on an upper portion and a number of copies made on a lower portion, a density adjusting key 22-3 for automatically adjusting an image density, a paper selecting key 22-4, a paper-size-based-on-scaling key 22-5 for enlarging or reducing an image based on a paper size, a sort key 22-6, a stack key 22-7, a staple key 22-8, a special document feeding key 22-9, a scaling key 22-10, a dual side/sequential paper key 22-12, a front cover/separating paper key 22-13, and a classification sorting key 22-14.

The keys 22-3 to 22-14 may be made up of a touch panel type of structure, and therefore it is possible to input data specified on the display 2 by touching the corresponding part of display 2. When information is input, the items displayed on the display 2 change.

FIG. 3 shows a situation, as an example, in which A4 size (landscape) paper is selected as the copying sheets. As shown in FIG. 3, there may be five paper feeding trays which accommodate A4(landscape), A4(portrait), B5(landscape), B4(portrait), A3(portrait) types of paper sheets respectively, and these sizes are displayed by detecting a size and orientation of the paper sheets accommodated in each paper feeding tray 10.

The classification reading and recording portion 5 reads and stores classification data which is formed in a predetermined area on an original document. The paper sheet detecting portion 11 detects and outputs information about paper sheet sizes which are accommodated in the paper sheet feeding trays 10, e.g. the orientation of the paper sheets, and whether a paper sheet feeding tray is empty, etc.

Next, referring to FIGS. 4 and 5, an operation of an embodiment according to the present invention will now be explained below.

In a step S1, copying conditions are set using the input information displaying portion 2, and after this setting, a copying operation starts by pressing a start key 29 of the input information displaying portion in a step S2.

Then, in a step S3, it is determined whether a classification sorting key 22-14 shown in FIG. 3 has been depressed, and if not, i.e. NO in step S3, an ordinary copying operation is executed in step S4. If the classification sorting key has been pressed, i.e. YES in step S3, in step S5 the controlling portion 4 commands the scanning portion 7 to scan a first sheet of an original document placed on a document feeding position of the image forming apparatus. The scanned original image data is then stored in the image memory 1 in order in a step S6.

Then in a step S7, the classification reading and recording portion 5 reads classification marks printed at a predetermined area of the original document and stores data of the classification marks in the image memory 1 corresponding the original image data to the read classification marks. Then, in a step S8, it is determined if there are any not-yet-scanned original documents on the document feeding position and if there are, i.e., YES in step S8, the same operations are repeated in steps S5 to 8.

Figure 11:
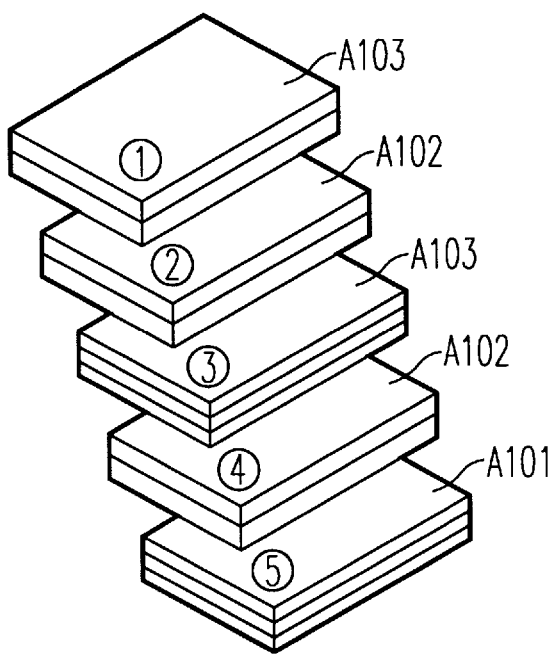
FIG. 11 shows five sets of original documents which are placed at a paper feeding position.

FIG. 13 shows an embodiment of a state in which the classification reading and recording portion 5 reads the classification marks on the original document as shown in FIG. 11 and stores the data from the original documents. That is, as shown in FIG. 11, assume that three sheets of the document (5) with a classification mark A101, two sheets of the document (4) with a classification mark A102, three sheets of the document (3) with a classification mark A103, two sheets of the document (2) with a classification mark A102 and two sheets of the document (1) with a classification mark A103 are, from the bottom, placed on the document feeding position. It is possible to put the classification marks A101 to A103 on every sheet of the documents, and also to put the classification marks on only a first page of each document, but an area at which the classification marks are written is predetermined in either case. In the embodiment as shown in FIG. 11, the classification marks are placed at the upper left corner of only the first sheet of each document.

In this embodiment, documents are scanned from the bottom in order. As shown in FIG. 13, since the classification marks are printed on only the first page of each document, the classification mark A101 is scanned in the third scanning operation (third page) for the documents and the classification marks A102, 103, 102 and 103 are scanned and stored in the fifth, eighth, tenth and twelfth scanning operations respectively. Thus data of the original document of FIG. 11 is stored in the image memory 1 as shown in FIG. 13.

The classification marks can be bar codes etc., instead of numeric characters. It is also possible to scan the classification marks using a separate scanning device or to extract classification mark data using a scanner of the image forming apparatus.

Again with reference to FIG. 4, after it is determined that original documents still do not remain, i.e., NO in step S8, the operation proceeds to step S9 in which the classification sorting portion 6 commands the controlling portion 4 to read data of the first classification mark A 101 [the (2n−1)th classification mark (n=1): in this case, n equals 1] which is stored in the classification reading and storing portion 5, and the controlling portion 4 reads out the image data of the first page from the image memory 1. Then, a copied image is formed in the transferring and fixing portion 8 (in step S10), and then in step S11 the copied paper is discharged.

In step S12, it is then determined if any not-yet-formed image data for the document (5) with the first classification mark A101 exists, and if YES in step S12, the operation in steps S9 to S12 is repeated. As shown in FIGS. 11 and 13, since there are three pages for the document (5), this operation is repeated three times.

Now with reference to FIG. 5, in a step S13 the classification sorting portion 6 determines if there is image data for the same classification mark [the (2n−1)th classification mark: in this case, n equals 1] by searching records of the classification reading and recording portion 5, and if YES in step S13, the operations in steps S9 to S13 are repeated. As shown in FIG. 13, in the example of the present specification of FIG. 11, since there is no same document with the first classification mark A101, the operation proceeds to step S14. In step S14, the classification sorting portion 6 searches the records of the classification reading and recording portion 5 and decides if there is image data for the 2nth (in this case, n equals to 1) classification mark which has not yet been formed, and if there is no such image data, NO in step S14, the operation proceeds to step S1 and waits for a next copying operation.

If YES in step S14, indicating that data with another classification mark is present, the operation proceeds to step S15. In step S15, the classification sorting portion 6 commands the controlling portion 4 to read data of the next classification mark A102 (the 2nth classification mark: in this case, n equals to 1) which is stored in the classification reading and recording portion 5, and the controlling portion 4 reads out image data of the fourth page from the image memory 1. Then, in step S16 an image of this fourth copied page is formed in the transferring and fixing portion 8, and further in step S17 the copied paper sheet is discharged onto the paper sheet discharging tray 9. If there is image data which still has not yet been formed, the operation returns into step S15 and the operations in steps S15 to S18 are repeated.

Then, in a step S19, the classification sorting portion 6 determines if there is any other document with the same classification mark as the 2nth (in this case, n equals to 1) by searching the record of the classification reading and recording portion 5, and if YES in step S19, the operations in steps S15 to S19 are repeated. In FIG. 13, since there are other documents with the classification mark A102 in the ninth and tenth pages, these pages are copied after the fourth and fifth pages are copied.

The operation then proceeds to step S20. In step 20, the classification sorting portion 6 searches the record of the classification reading and recording portion 5, and determines if there are any not-yet-formed image data with the next classification mark (2n−1)th (in this case, n equals to 2). If YES in step S20, the operations in steps S9 to S20 are repeated, and if NO in step S20, the operation returns to step S1 and waits for a next copying command.

As described above, with this operation in the present invention it is unnecessary to manually sort documents based on classification marks since classification marks which are on the documents are scanned and stored, to which a scanned and stored original image data are related, and when images are formed the images are sorted and formed on paper sheets based on the classification marks.

Figures 12A, 12B:
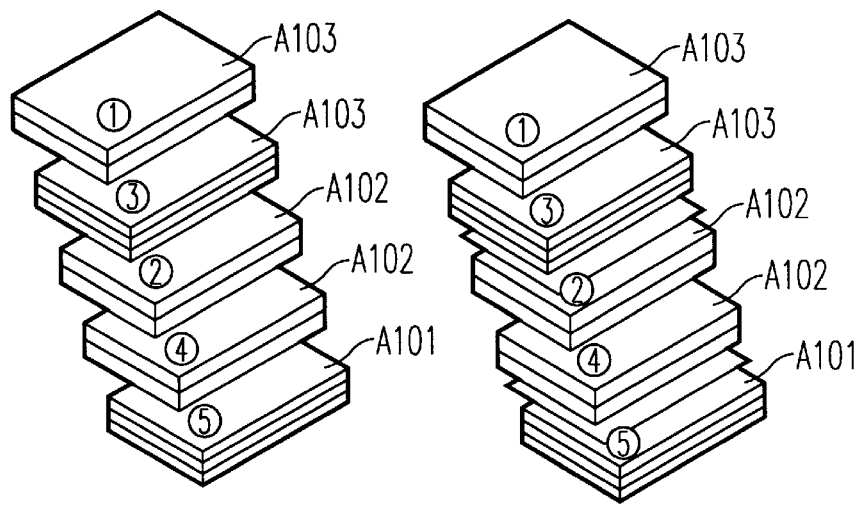
FIGS. 12(A)–12(F) are diagrams showing original documents which are discharged onto a paper sheet discharging tray in different embodiments of the present invention.

Following the above-mentioned flowcharts in FIGS. 4 and 5, images are formed and output as shown in FIG. 12(A) in which documents with the same classification mark are sorted and discharged onto the paper sheet discharging tray.

Figure 6:
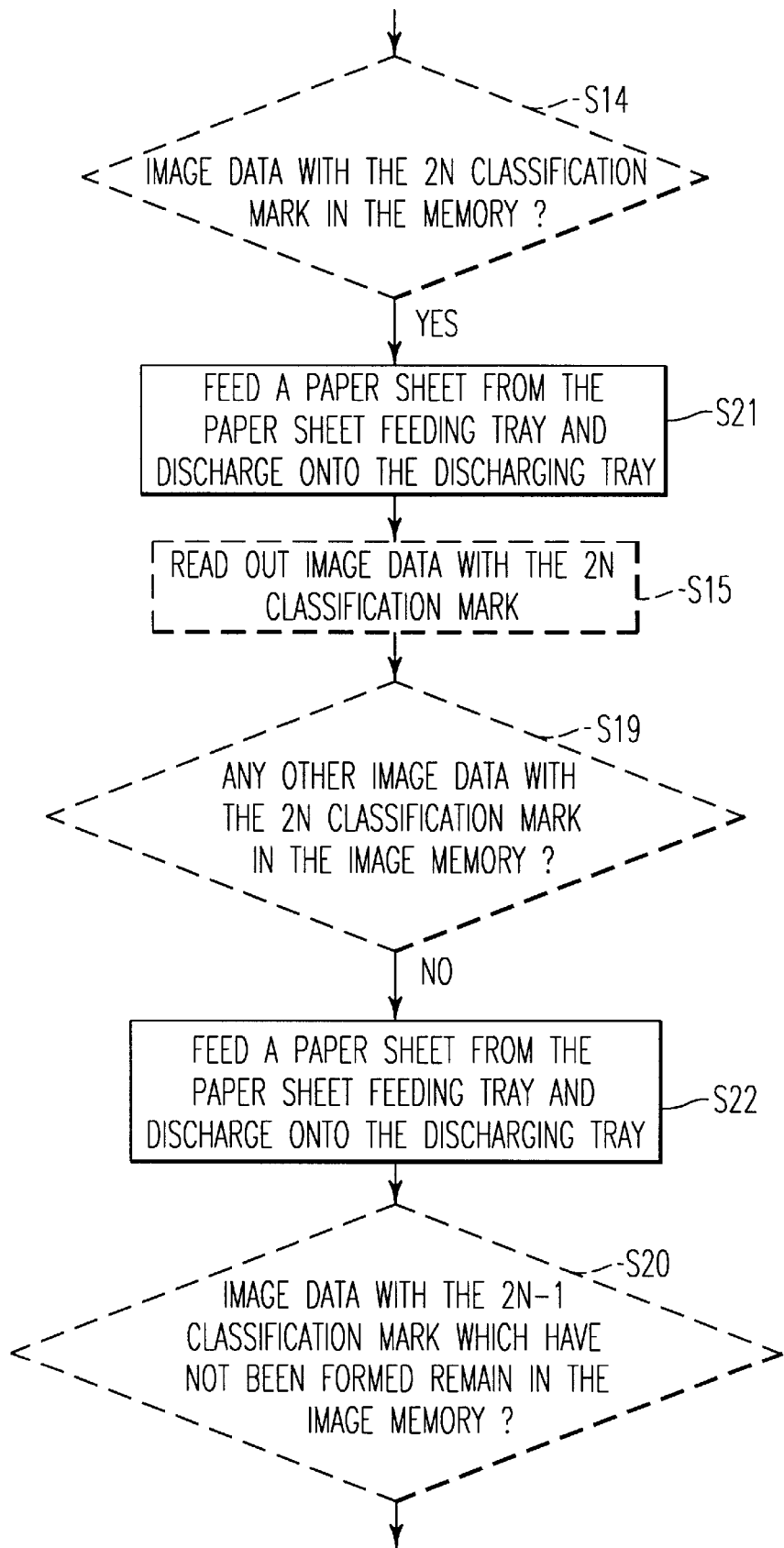
FIG. 6 is a flow chart showing an operation according to an embodiment of the present invention.

Next, a further embodiment according to the present invention will be explained below referring to the flowchart in FIG. 6. In this further embodiment, a step S21 is inserted between the steps S14 and S15 in the flowchart of the embodiment of FIGS. 4 and 5, and a step S22 is inserted between steps S19 and S20. In steps S21 and S22, the classification sorting portion 6 commands the controlling portion 4 to feed a paper sheet from the paper sheet feeding tray 10 and transport the paper sheet onto the paper sheet discharging tray to be placed between the documents with the different classification marks.

Thus, by including steps S21 and S22, as shown in FIG. 12(B), paper sheets are inserted between documents with different classifications (between the documents (2) and (3), and between the documents (4) and (5)), whereby it is possible to separate the documents based on the classification marks and it is not necessary to manually sort these documents based on the classification marks.

Figure 7:
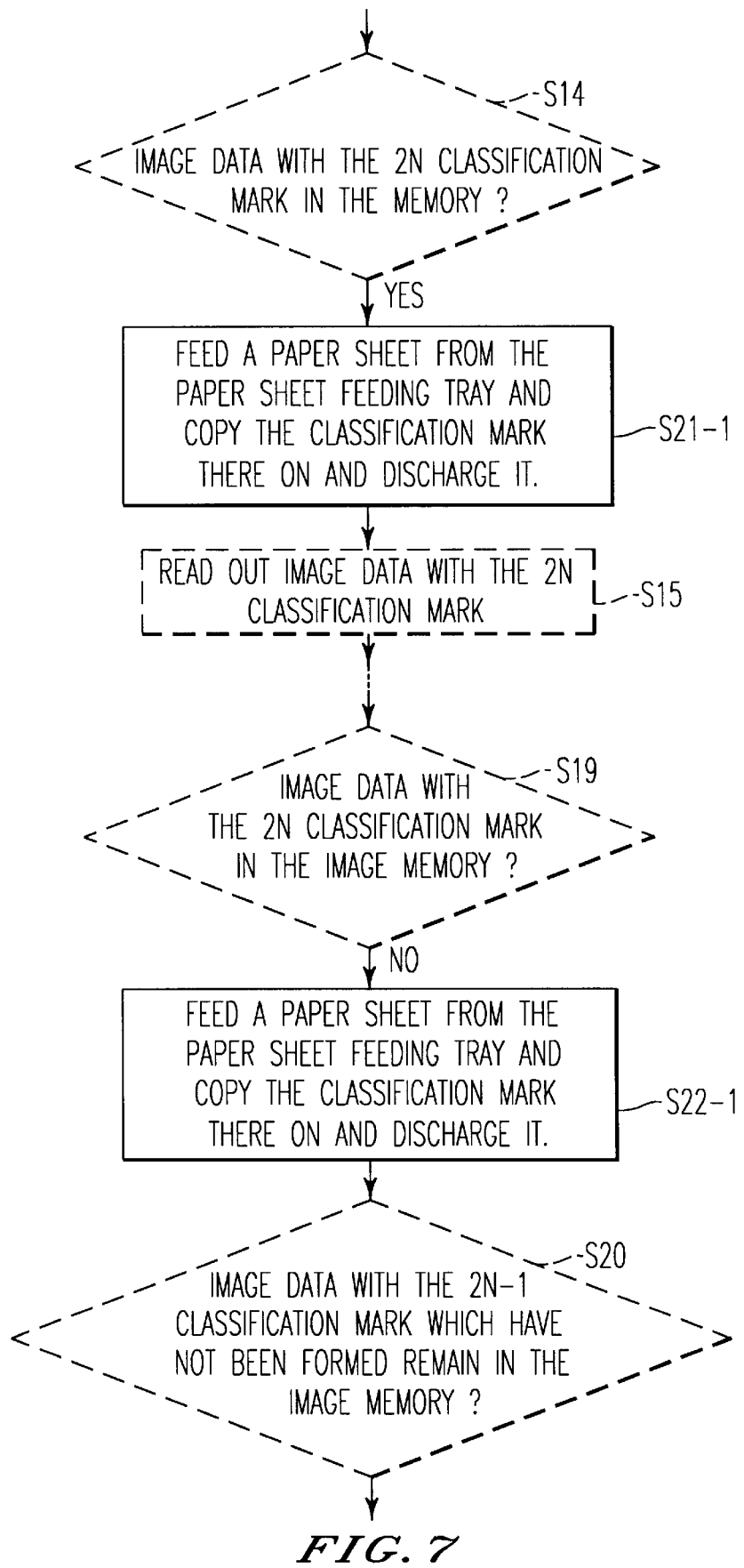
FIG. 7 is a flow chart showing an operation according to an embodiment of the present inventions.

Next, referring to FIG. 7, a further embodiment of the present invention will now be explained. In this further embodiment, a further operation is executed in a step S21-1 instead of step S21 of the embodiment of FIG. 6, and step S22-1 is executed instead of step S22 of the embodiment of FIG. 6.

Figures 12C, 12D:
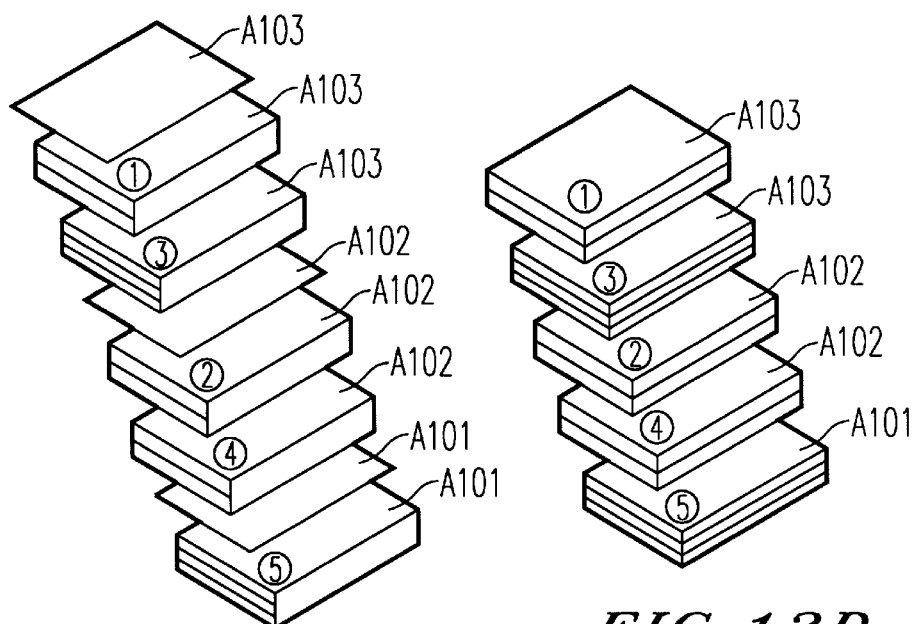

In steps S21-1 and S22-1, the classification sorting portion 6 commands the controlling portion 4 to feed a paper sheet from the paper sheet feeding tray 10 and discharge the paper sheet onto the paper sheet discharging tray after copying the classification mark thereon, see FIG. 12(C). That is, in this further operation the inserted sheets have identifying classification marks printed thereon. In copying the classification mark on a paper sheet, based on an image data of the classification mark which is stored in a predetermined area in the image memory 1, the classification mark image is formed, or is formed with an enlargement. As shown in FIG. 13, with this further operation it is possible to store printing patterns for printing marks corresponding to the classification marks and read the stored printing pattern and form an image on a paper sheet. Thus, as shown in FIG. 12(C), the classification marks are copied on paper sheets which are inserted between documents with the different classification marks. Accordingly, with this further operation it is possible to more easily sort documents based on the classification marks and to easily identify these classification marks.

Next, a further embodiment according to the present invention will be described referring to the flowchart in FIG. 8. In this further embodiment, a step S15-1 is executed instead of step S15 of FIGS. 4 and 5. In step S15-1, the classification sorting portion 6 commands the image rotating portion 3 to rotate (for example by 180 degrees) image data stored in the image memory 1 (read the image data in opposite order), and the operation then proceeds to step S16, and then an image is formed. This operation results in stacking documents as shown in FIG. 12(D). As shown in FIG. 12(D), documents with a different classification mark are discharged onto the paper sheet discharging tray with opposite directions. Therefore, the classification sorting operation can be accomplished even easier.

Figures 12E, 12F:
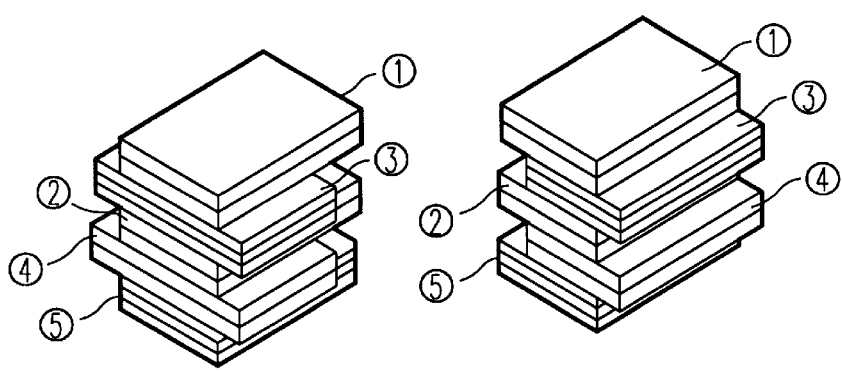

Next, a further embodiment of the present invention will be explained by reference to FIG. 9. In this further embodiment, steps S23 and S15-2 are executed instead of step S15 of the flowchart of FIGS. 4 and 5. In step S23, the classification sorting portion 6 finds the paper sheet feeding tray of which the same size of paper sheets as ones used for the original document having the (2n−1)th classification mark, but which are accommodated in a direction different by 90 degrees, and a paper sheet in such a found tray is then fed. Then, in step S15-2, the classification sorting portion 6 commands the image rotating portion 3 to rotate by 90 degrees image data stored in the image memory 1 by reading the data in a sub-scanning direction perpendicular to a main scanning direction of the scanning portion 7, and thereby an image is formed in step S16. This operation results in stacking documents as shown in FIG. 12(E). Accordingly, as shown in FIG. 12 (E), documents with different classification marks are alternatively placed with 90 degree different orientations on the paper sheet discharging tray. It is therefore possible to easily sort these documents.

Figure 10:
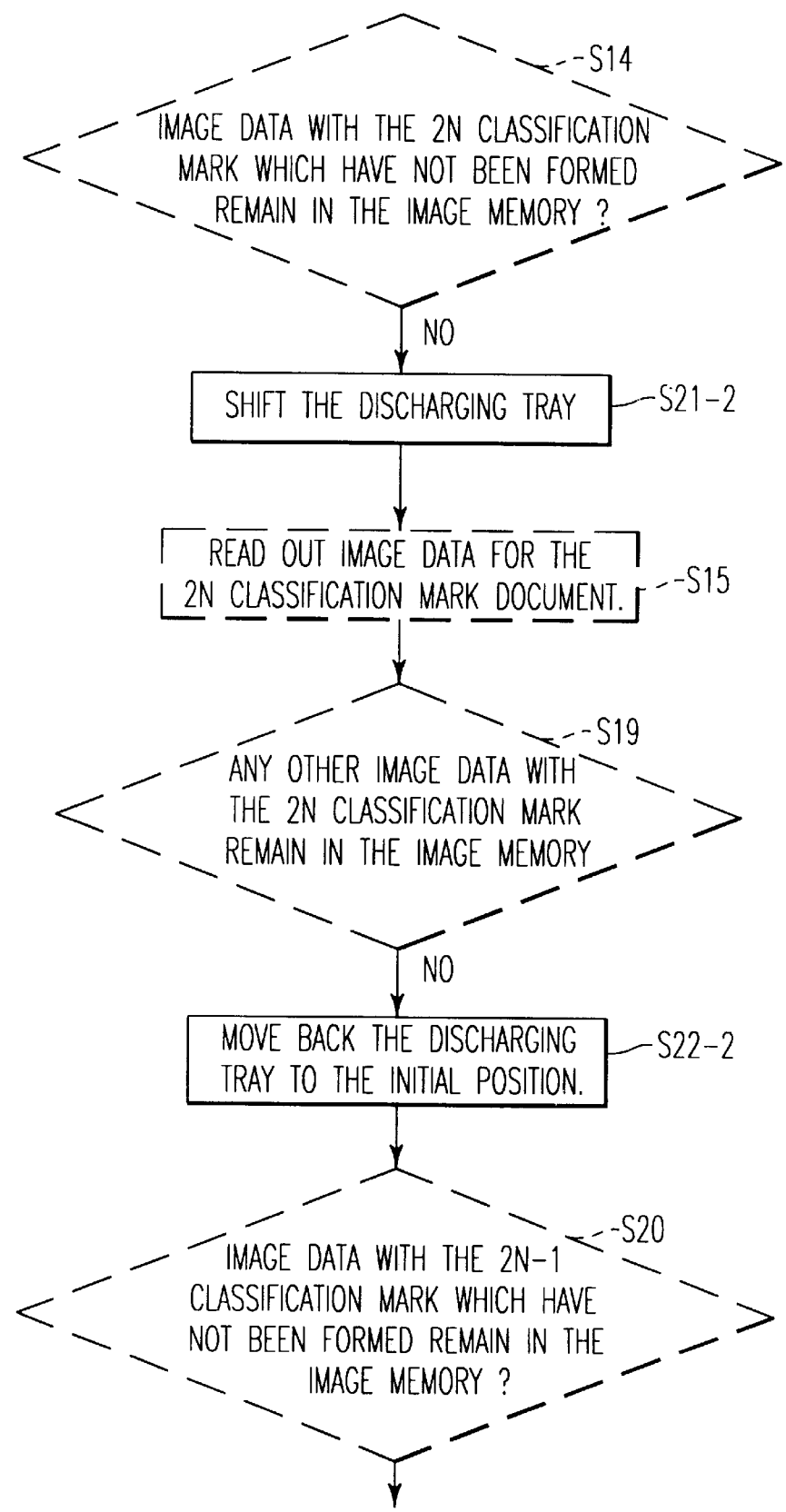
FIG. 10 is a flowchart showing an operation according to an embodiment of the present invention.

Next, a description of a further embodiment according to the present invention will be given below. In this further embodiment, as shown in FIG. 10, step S21-2 and step S22-2 are respectively inserted between steps S14 and S15 and between steps S19 and S20 in the operations of FIGS. 4 and 5.

In step S21-2, the classification sorting portion 6 commands to shift the paper sheet discharging tray aside. In step S22-2, the classification sorting porting 6 commands to put the paper sheet discharging tray back to its initial position. This operation results in stacking documents as shown in FIG. 12(F). As shown in FIG. 12(F), documents with different classification marks are discharged in shifted positions on the paper sheet discharging tray. Therefore, it is possible to easily sort documents by classification marks.

Figure 14:
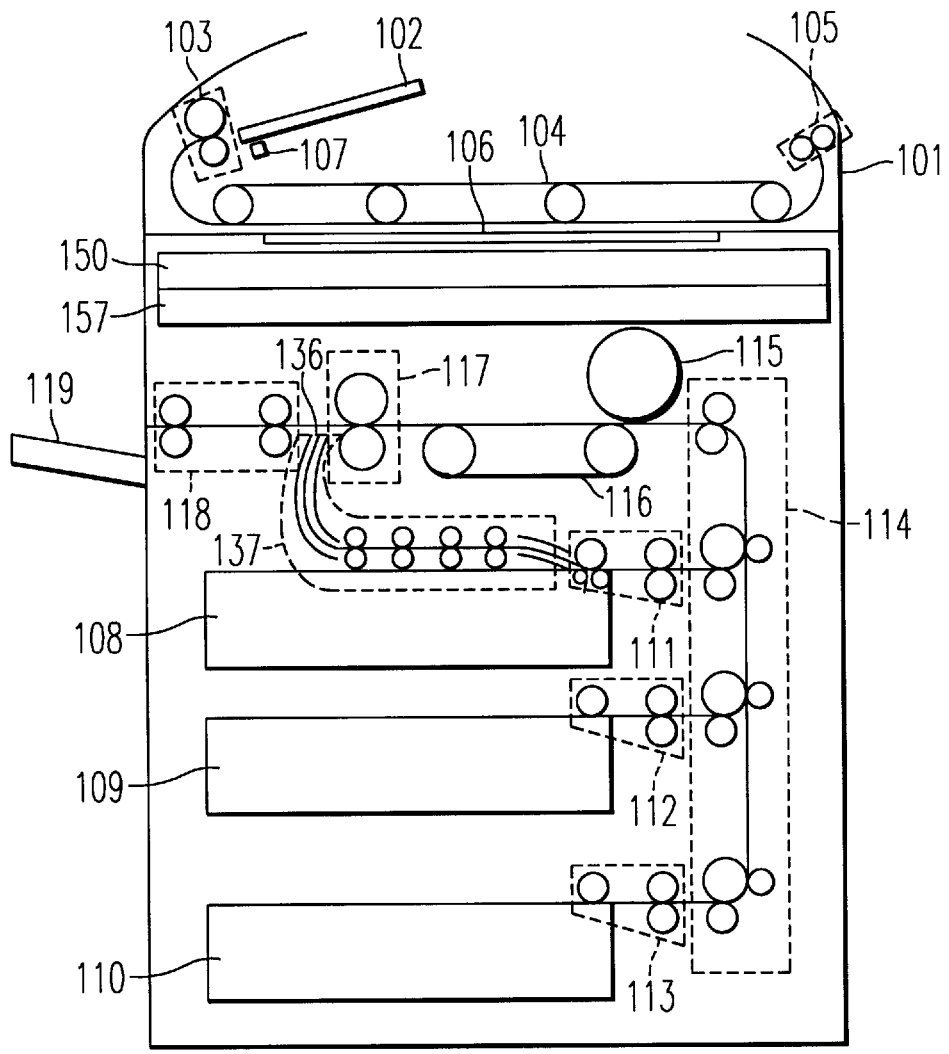
FIG. 14 is a schematic view of an image forming apparatus capable of sorting documents based on date information (as classification marks)
Figure 15:
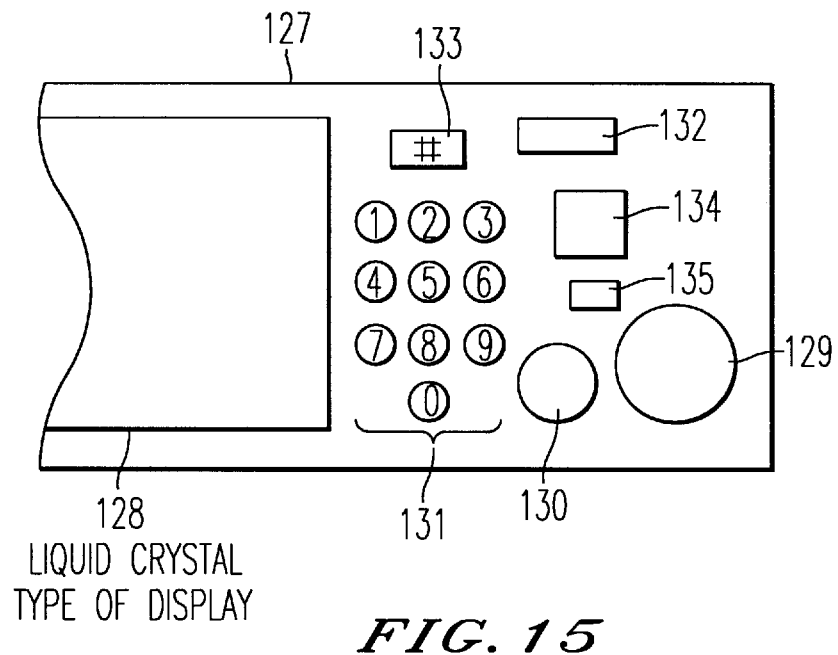
FIG. 15 is a diagram of an operating panel of the image forming apparatus shown in FIG. 14.
Figure 16:
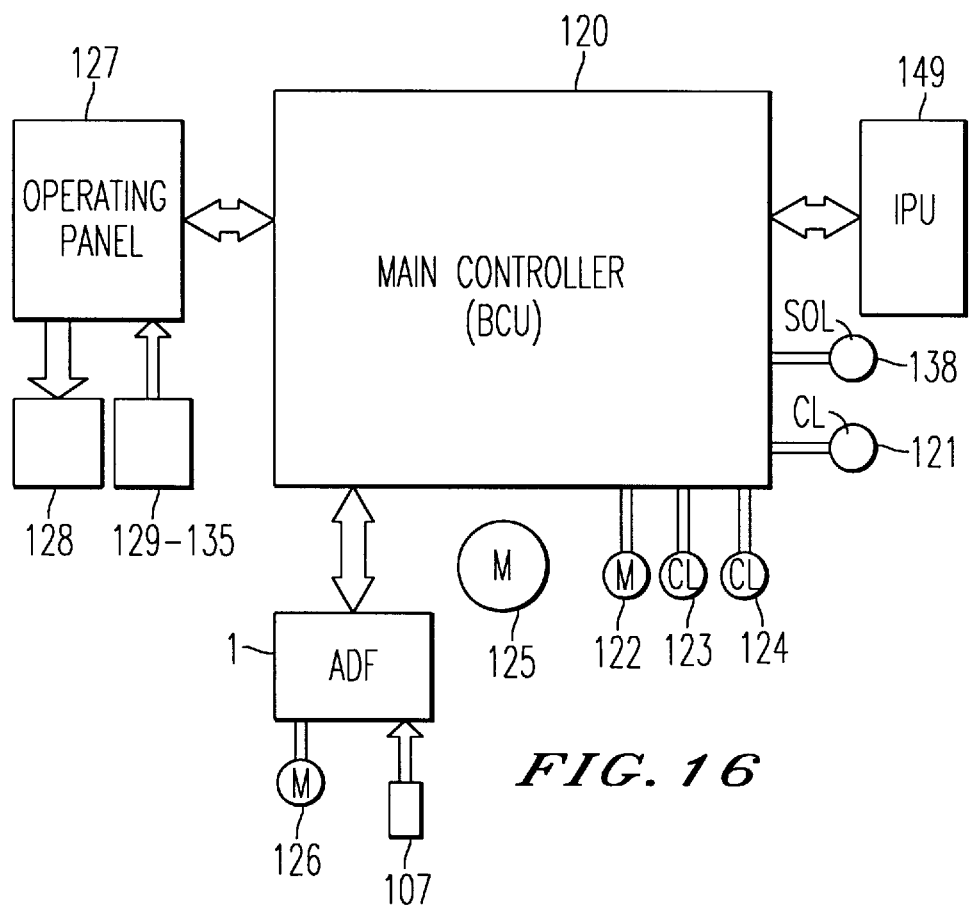
FIG. 16 is a block diagram of the image forming apparatus shown in FIG. 14.
Figure 17:
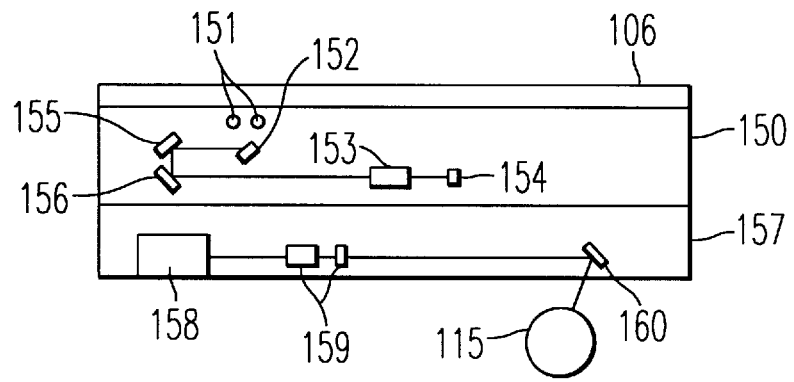
FIG. 17 is a schematic view of an optical system in a reading unit and writing unit of the image forming apparatus shown in FIG. 14.

FIG. 14 shows an image forming apparatus according to a further operation of the present invention which is capable of sorting documents with date information (e.g., as the classification marks). FIG. 15 is a schematic view of an operating panel of the image forming apparatus shown in FIG. 14. FIG. 16 is a block diagram of an electric system of the image forming apparatus shown in FIG. 14. FIG. 17 is a schematic view illustrating an optical system in a reading unit and a writing unit of the image forming apparatus shown in FIG. 14.

This further embodiment of the present invention essentially operates so that the documents contain date information (e.g., year, month, day, of generation of the original document), and this date information is read and sorting of the documents is based on this date information. Thus, with this operation in the present invention, the classification marks as discussed above include date information.

As shown in FIG. 14, on a document feeding portion 102 of an automatic document feeder 101 (hereinafter referred to as an ADF) are placed a ream of documents facing up, a bottom of which is fed onto a predetermined position of a contact glass 106 by a paper sheet feeding roller 103 and a paper sheet feeding belt 104 one by one when a start key 129 of the operating panel 127 shown in FIG. 15 is pressed. After the reading unit 150 scans the document on the contact glass 106 and reads image data of the document, the document is discharged by the paper sheet feeding belt 104 and a paper sheet discharging roller 105. Further, when a document detecting sensor 107 detects documents on the document feeding portion 102, the next document is fed onto the contact glass 106. The paper sheet feeding roller 103, paper sheet feeding belt 104 and paper sheet discharging roller 105 are driven by a transporting motor 126 shown in FIG. 16. A paper sheet in a first tray 109 or in a second tray 110 is fed by a first paper sheet feeding device 112 or a second paper sheet feeding device 113, and such a fed paper sheet is transported to a position where the fed paper sheet is in contact with a photoconductive member 115 by a vertical transporting unit 114.

An image is then transferred from the photoconductor member 115 to the fed paper sheet. The paper sheet on which an image from the photoconductive member 115 has been formed by the writing unit 157 is then transported to a fixing unit 117 by a transporting belt 116, and the image is then fixed on the paper sheet, which is then discharged onto a discharging tray 119 by a discharging unit 118. The photoconductive member 115, the transporting belt 116, the fixing unit 117 and the paper sheet discharging unit 118 are driven by a main motor 125 shown in FIG. 16, and the paper sheet feeding devices 112 and 113 are driven via paper sheet feeding clutches CLs 123 and 124 shown in FIG. 16 respectively by the main motor 125. The vertical transporting unit 114 is driven via an intermediary clutch CL 121 shown in FIG. 16 by the main motor 125.

The operating panel 127 shown in FIG. 15 includes a display 128, for example a liquid crystal type of display, a start key 129, a clear/stop key 130, a numeric keypad key 131, a sorting mode key 132, an enter key 133, a mode clear key 134 and a dual copy mode key 135, etc. On the display 128 is displayed a mode which is set by the keys, a number of paper sheets to be copied, messages of status information of the image forming apparatus, etc.

When a dual copy mode is set by the dual copy mode key 135 shown in FIG. 15, first an image is formed on a front side of a fed paper sheet. A switching claw 136 shown in FIG. 14 is driven by activating a switching solenoid SOL 138 shown in FIG. 16, and the paper sheet which has been fed from a tray 109, 110 and has had an image formed thereon and fixed by the fixing unit 117 is transported by a dual copy transporting unit and a dual copy paper sheet feeding device 111 (driven by a dual copy transporting motor 122 shown in FIG. 16) and is stacked in a dual copy tray 108. When an image is to be formed on the back side of this paper sheet, the switching solenoid SOL 122 shown in FIG. 16 is turned off, whereby the switching claw 136 is returned to its initial position. The paper sheet in the dual copy tray 108 is then fed by the dual copy paper sheet feeding device 111 and the transporting motor 122 is driven in an opposite direction as when stacking. Then, an image is formed on the fed paper sheet on the back side thereof and the paper sheet is then discharged.

The writing unit 150, as shown in FIG. 17, includes a contact glass 106 for supporting documents and an optical scanning system. The optical scanning system includes an exposing lamp 151, a first mirror 152, a lens 153 and a CCD image sensor 154. The exposing lamp 151 and the first mirror 152 are fixed on a first carriage (not shown). A second mirror 155 and a third mirror 156 are fixed on a second carriage (not shown). When scanning a document, the first carriage and the second carriage are mechanically operated at relative speeds of two to one (2:1) so that an optical path length is not changed. The optical scanning system is driven by a scanner driving motor (not shown). An original document is scanned by the CCD image sensor 154 and original document data is processed after conversion into electric signals. Image scale changes can be implemented by moving the lens 153 and the CCD image sensor 154 in left and right directions in FIG. 17. According to an indicated scale, a position of the lens 153 and the CCD image sensor 154 is set in the left-right direction.

The writing unit 157 includes a laser output unit 158, a focusing lens 159 and a mirror 160. The laser output unit 158 may include a laser diode as a laser light source and a polygon mirror which rotates at a high and constant speed. Laser light from the writing unit 157 is irradiated onto the photoconductive member 115 of the image forming system of the image forming apparatus. A beam sensor (not shown) which generates main scanning synchronizing signals is disposed at a position where the laser beam is irradiated and may be adjacent to an end of the photoconductive member 115.

Figure 18:
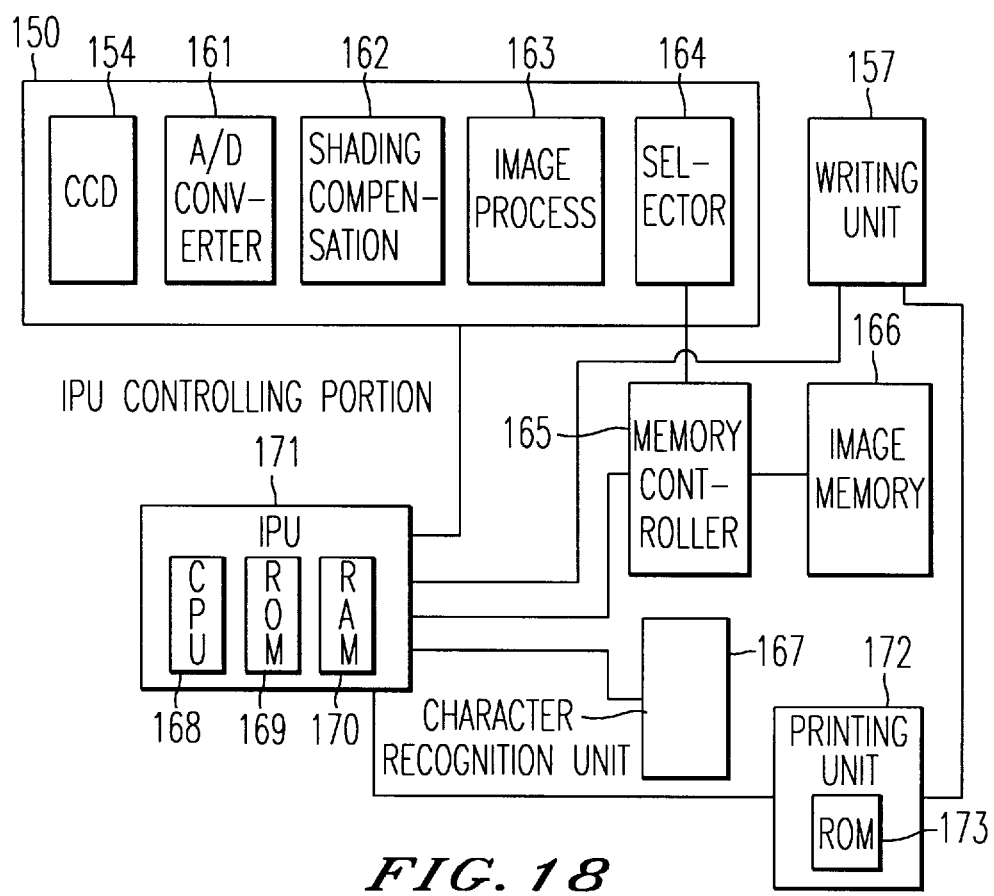
FIG. 18 is a view illustrating the image processing portion shown in FIG. 14.

Next, referring to FIG. 18, an image processing unit (IPU) 149 shown in FIG. 16 will be described below.

First, reflected light from the exposing lamp 151 is converted photoelectrically by the CCD image sensor 154 and is further converted into digital signals by an A/D converter 161. The image signals which have been converted into the digital signals are then processed by a shading compensation unit 162 and an image processing unit 163 for an MTF compensation, a compensation and a scaling process. A selector 164 selects (e.g. switches to) either an image memory controller 165 (which is described later) or a writing unit 157. When image data is input to or output from the image memory 166, the data goes through the image memory controller 165. The selector 164 and the image memory controller 165 are connected to be able to input or output data bidirectionally.

An IPU controlling portion 171 is provided for setting the image memory controller 165, etc., or controlling the reading unit 150 and the writing unit 157 and includes a CPU 168, a ROM 169 for storing programs or data and a RAM 170. Further, the CPU 168 is able to read data from or write data to the image memory 166. A character recognition unit 167 recognizes characters in a predetermined area of the image memory 166 which is set by the CPU 168 and generates information of the characters and their direction in the predetermined area in one page (4800×6800) to be numerical data, and then, the numerical data is sent to the CPU 168. If the characters are recognized, data representing the recognized characters is sent to the CPU 168. If not, a value 255(FFh) is sent to the CPU 168 as data representing the failure in recognizing the characters.

The results of the recognition for each document are stored with date data in a date data area of the RAM 170. Date information=0 shows that no document has been scanned and data information=255(FFh) shows that documents for which character recognition can not be accomplished have been scanned.

Figure 19:
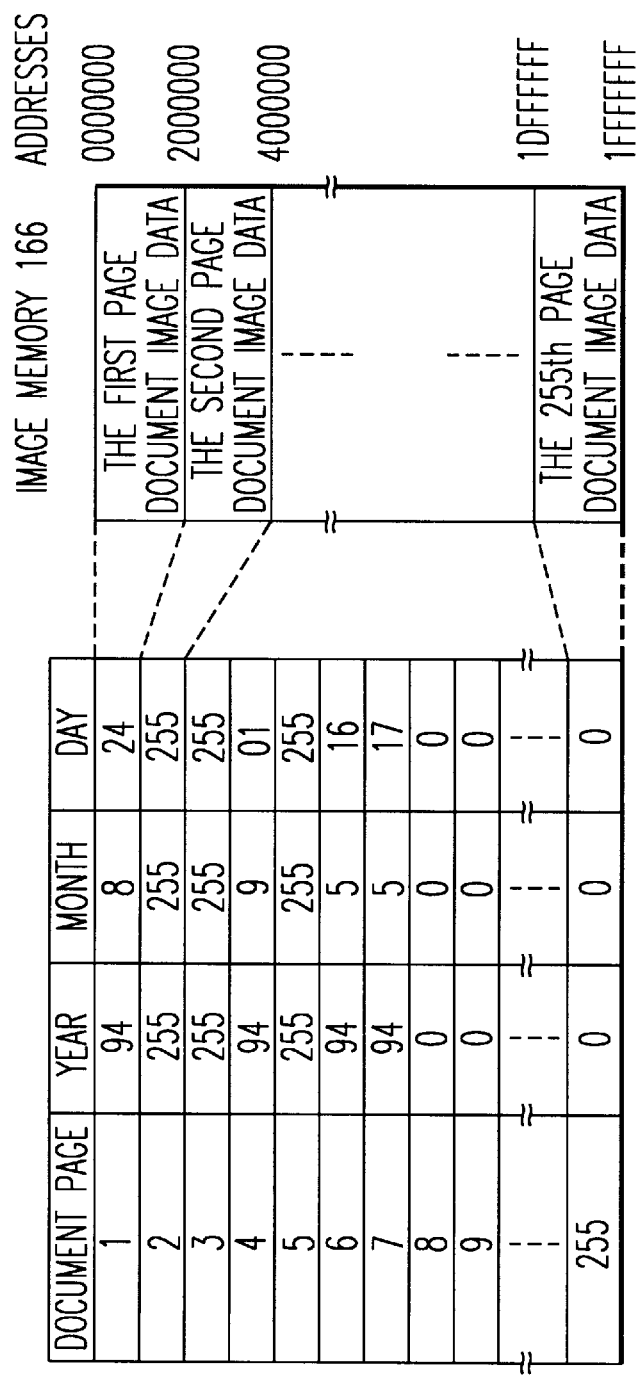
FIG. 19 is a diagram showing relations between recognition results and addresses storing image data for different pages.

FIG. 19 shows relationships between an address where an image data of each page is stored and its recognition result. As shown in FIG. 19, for each document corresponding date data (e.g., year, month, day) is stored. A printing unit 172 includes a ROM 173 for storing image patterns of numeral, alphabet and/or Chinese characters, and if the IPU controlling portion 171 commands the printing unit 157 to send image patterns, the printing unit 172 reads out the character image patterns from the ROM 173 and sends them to the writing unit 157.

Figure 20:
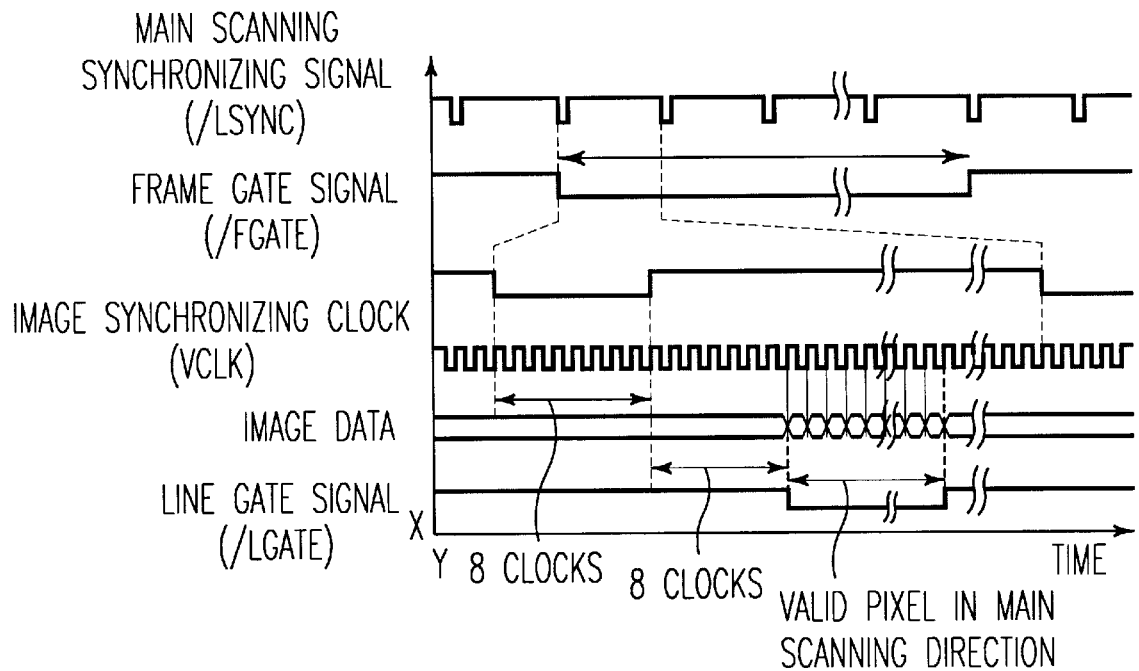
FIG. 20 is a diagram illustrating image signals for one page in a selector.
Figure 21:
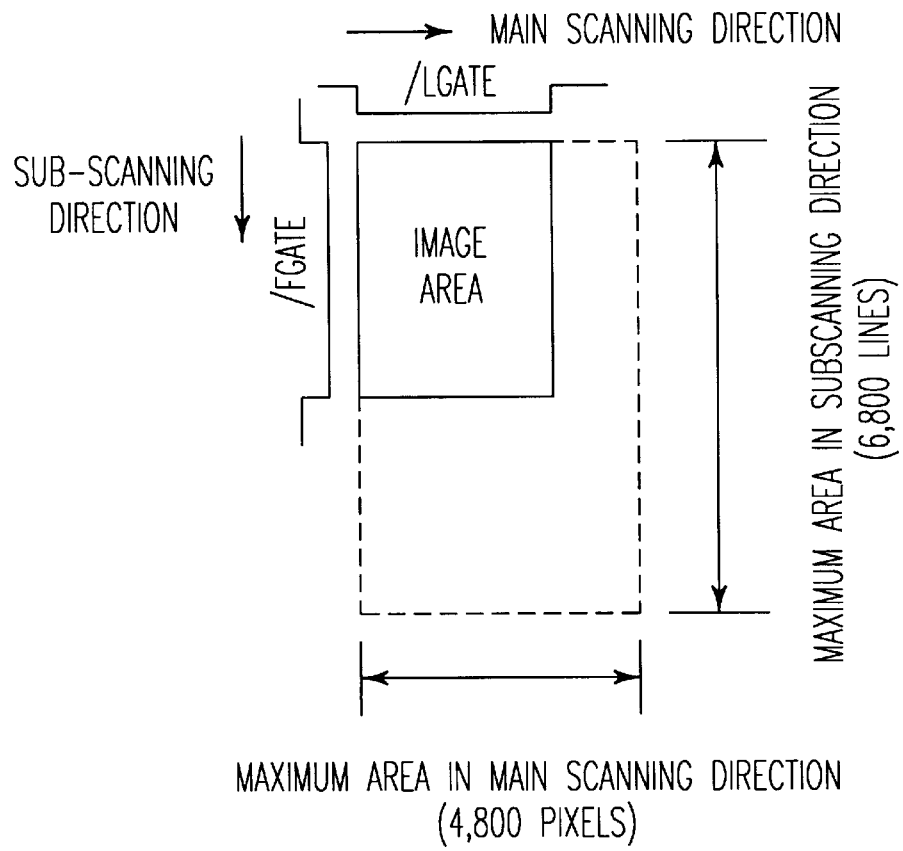
FIG. 21 is a diagram showing relations between an image to be formed on a paper sheet and image signals.

Next, referring to FIG. 20, image signals for a page in the selector 164 will now be explained. In FIG. 20, the signal/ FGATE represents a valid period in the sub-scanning direction of one page image data, and the signal/LSYNC represents a main scanning synchronizing signal of each line. Image data becomes valid in a predetermined number of clocks after the main scanning synchronizing signal is at a logical one, and the signal/LGATE represents that image data in the main scanning direction is valid. These signals are synchronized with image clock VCLK and eight bit (256 gradient) data is sent during a cycle of VCLK. In this embodiment, the writing density onto paper sheets may be 400 dpi, the maximum number of pixels in the main scanning direction may be 4800 and the maximum number of pixels in the sub-scanning direction may be 6800. Relationships between an image which is formed on a paper sheet and the signals/FGATE and/LGATE is shown in FIG. 21. In this embodiment, image data is whiter as the data is closer to a value 255.

Figure 22:
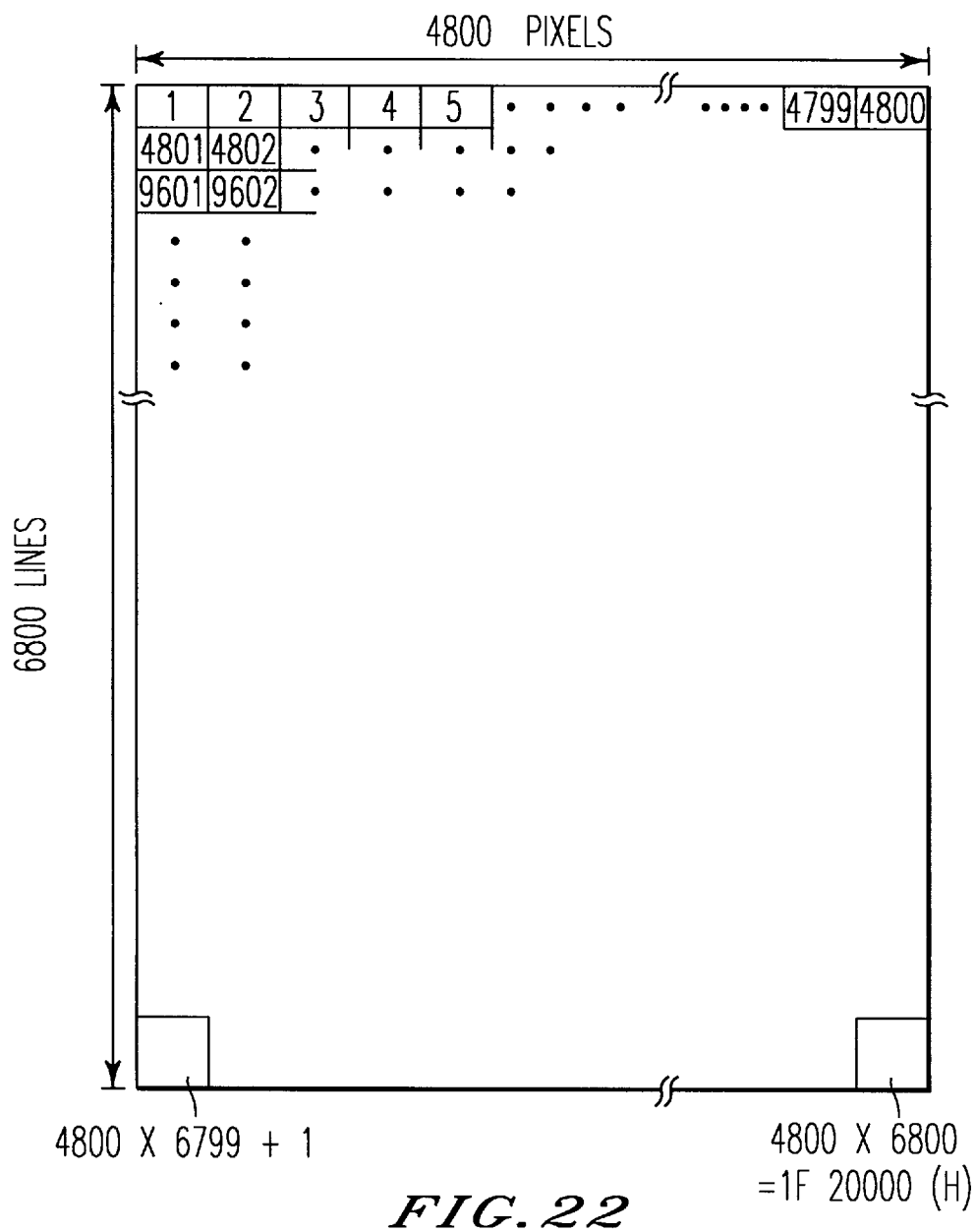
FIG. 22 is a diagram showing a state in which image data are stored in an image memory.

Inputting and outputting of data to and from the image memory 166 will now be explained below. The image memory 166 is capable of not only inputting and outputting data by the image memory controller 165, but also rotating image data by 180 degrees when outputting the image data. The memory controller 165 controls, via an image bus, the inputting and outputting of image data by setting an image area corresponding to the image signals shown in FIG. 20 and an operating mode in CPU 168. Image data is stored as eight bit data (256 gradient) in the image memory 166. FIG. 22 shows a state in which image data is stored in the image memory 166.

Next, creation of addresses of the image bus which are output from the image memory controller 165 will be explained. An address Ad which is output to the image memory 166 and for which an image is output from or input to is created by two counters Xc and Xy which are counted up and down by the signals/LSYNC or/VCLK and a top address Ap which shows a top of an image on a page. When a page which is input or output is represented as p, the top address Ap is shown as follows: Ap=200000h X p Inputting An Image
Counting up Xc: each signal/VCLK (reset by/LSYNC)
Counting down Yc: each signal/LSYNC
Ad=Ap+Xc+Yc X4800

Outputting An Image (NO Rotation)
Counting down: each signal/VCLK (reset by/LSYNC)
Counting up: each signal/LSYNC
Ad=Ap+Xc+Yc X4800
Outputting An Image (Rotation)
Counting down Xc: each signal/VCLK (reset by/LSYNC)
Counting up Yc: each signal/LSYNC
Ad=Ap+4800+Xc+(6800+Yc) X 4800

Referring to the following flowcharts, an operation of the image processing unit (IPU) 149 will now be described.

Figure 23:
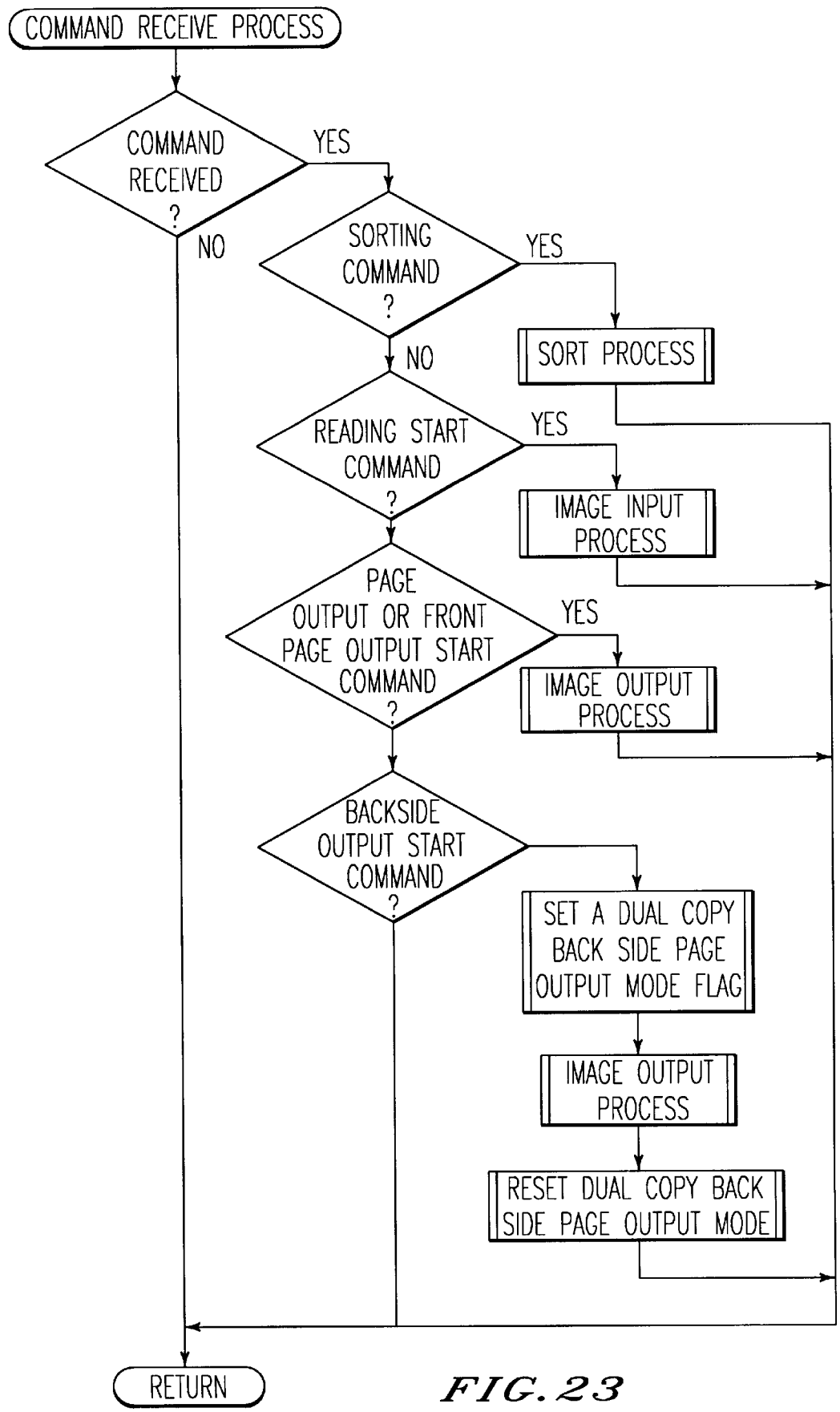
FIG. 23 is a flowchart showing an operation of the present invention in a case that a command is received during a waiting time.

FIG. 23 is a flowchart showing a case in which a command is received during a waiting period. When the command is received, it is determined if the command indicates an operation in a sort mode, image input mode or an image output mode (a regular, a front page, a back page) etc.

Figure 24:
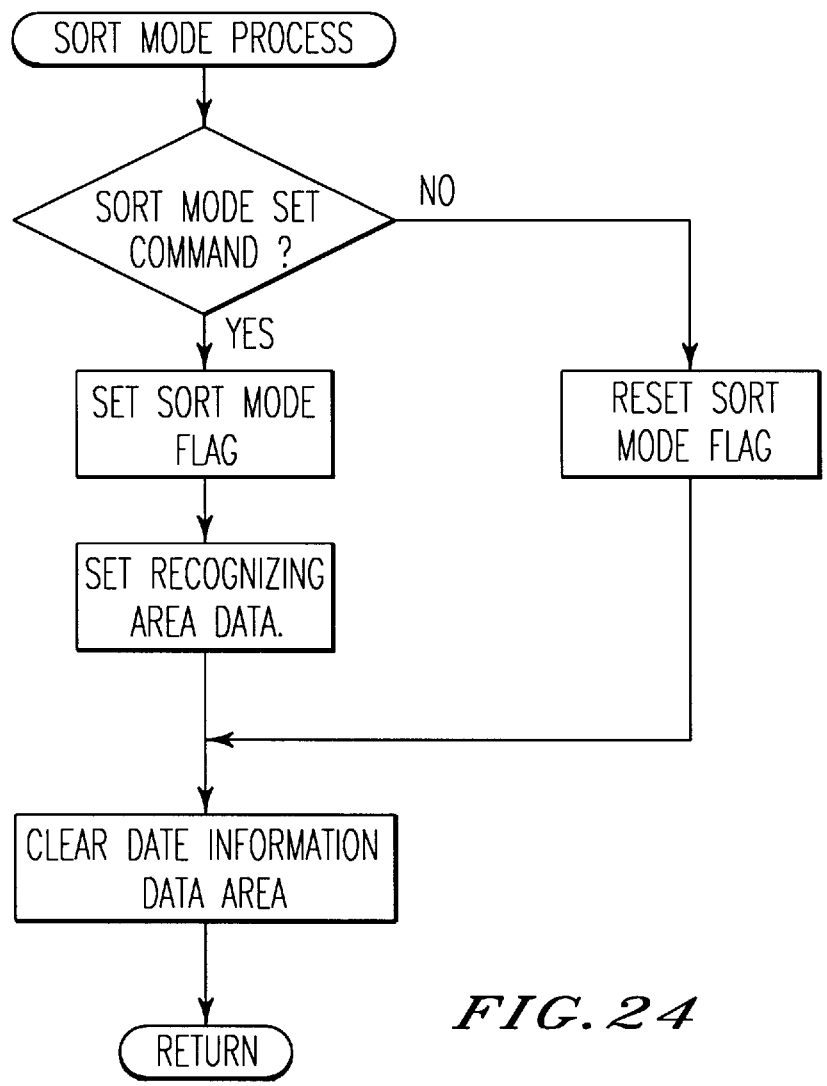
FIG. 24 is a flowchart showing an operation of the present invention of a set/reset of a sort mode.

FIG. 24 shows a flowchart of a set/reset process of the sort mode. When a set command is received, a sort mode flag is set, and a character recognition area data, which is received at a same time as receiving the command, is set. The character recognition area may be an arbitrary rectangular area, for example 4800×6800 pixels of a page of the image memory 166, as shown in FIG. 22. When a reset command is received, the sort mode is reset. At the end of the processes, the date information data area is cleared.

Figure 25:
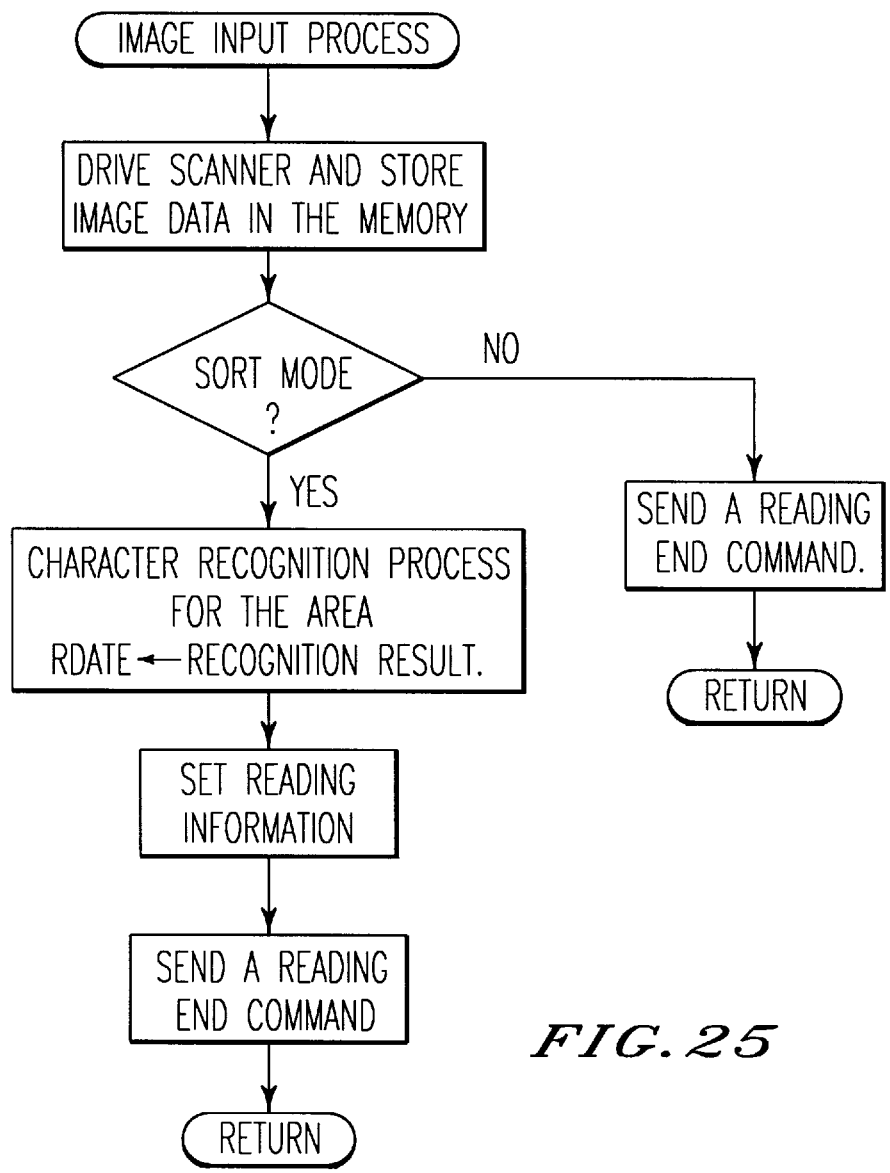
FIG. 25 is a flowchart showing an operation of the present invention of an image reading/page recognition.
Figure 26A:
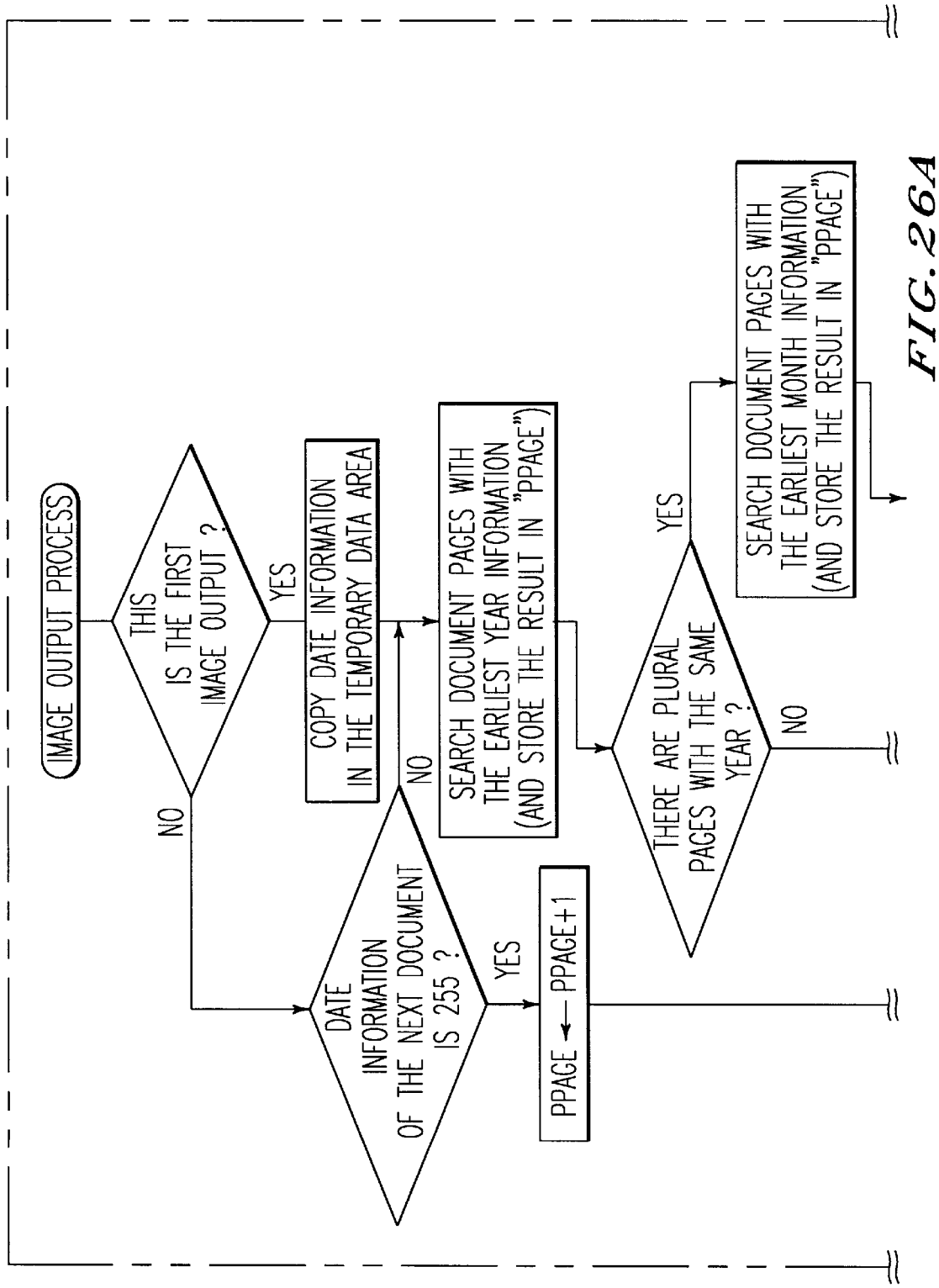
FIG. 26 is a flowchart showing an operation of the present invention of an image output process.
Figure 26B:
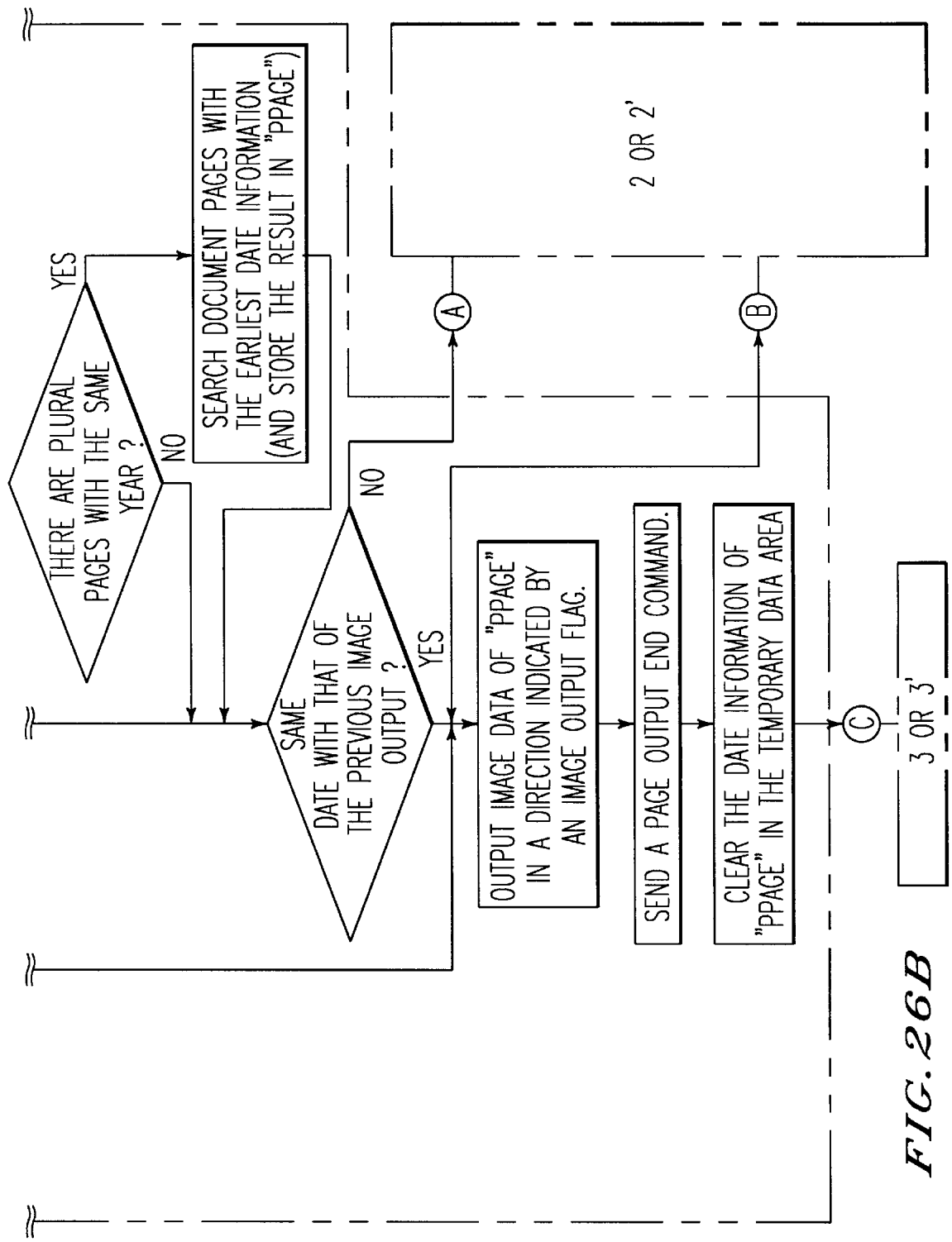

FIG. 25 shows a flowchart of an image reading/page recognition. When an image reading start command is received, the IPU controlling portion 171 has the reading unit 150 start the scanning operation, and then the scanned image data is stored in the image memory 166. When the image inputting operation is finished, it is determined if operation is in the sort mode, and if not, a reading end command is sent. If operation is in the sort mode, in the character recognition unit 167, characters which are in the predetermined area are recognized, and then the result of the recognition is stored as a three byte variable "rdate" data in order of year, month and day. If recognition can not be accomplished, such as in a case in which there is no date date, a value of FFh is stored in each byte of "rdate".

After the recognition operation ends, the recognition results are stored in the date information data area. FIG. 19 shows a state in which the data is stored in the date information data area. Further, a reading end command is then generated.

Figure 27:
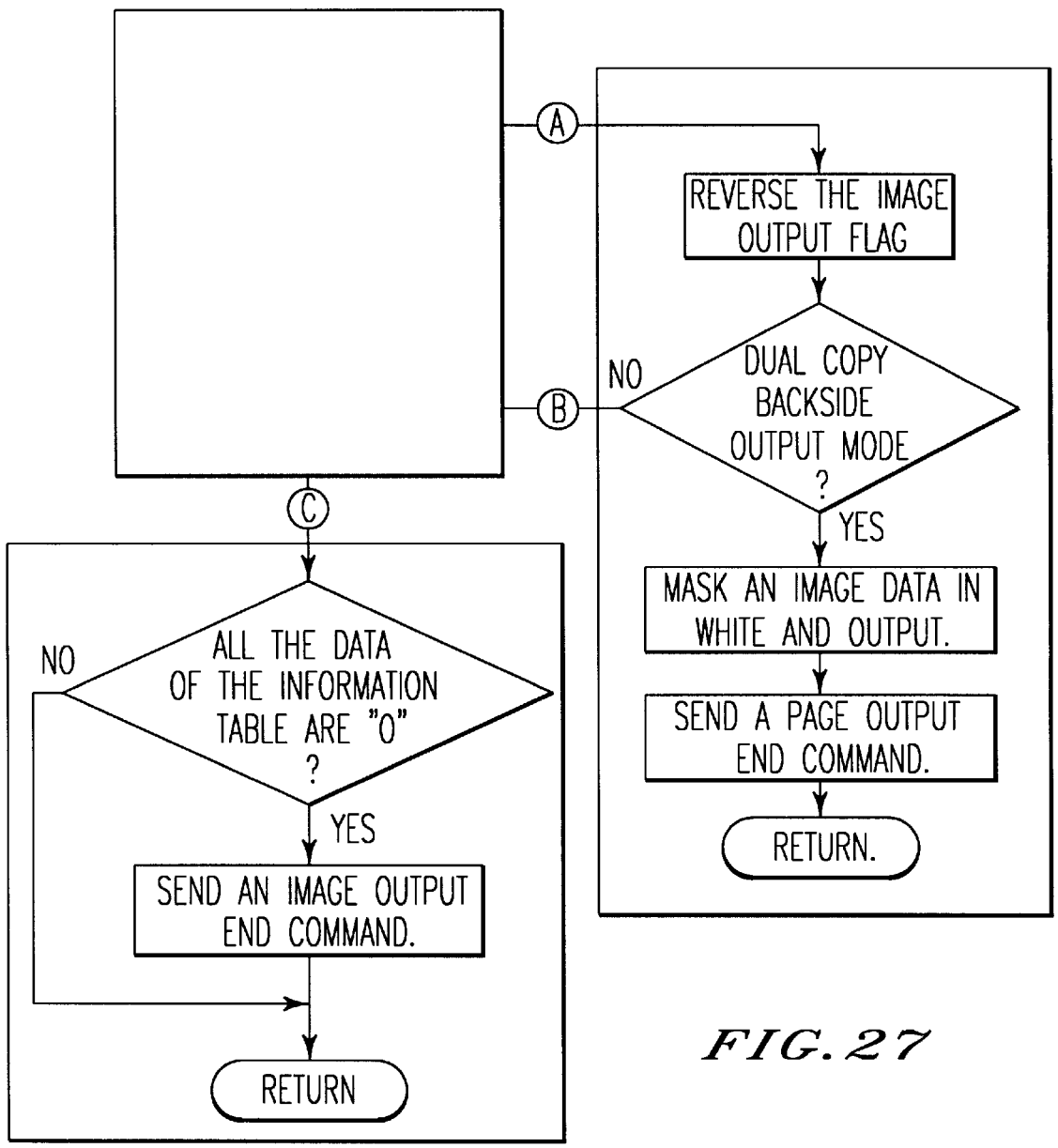
FIG. 27 is a flowchart showing an operation of the present invention of an image output process.
Figure 28:
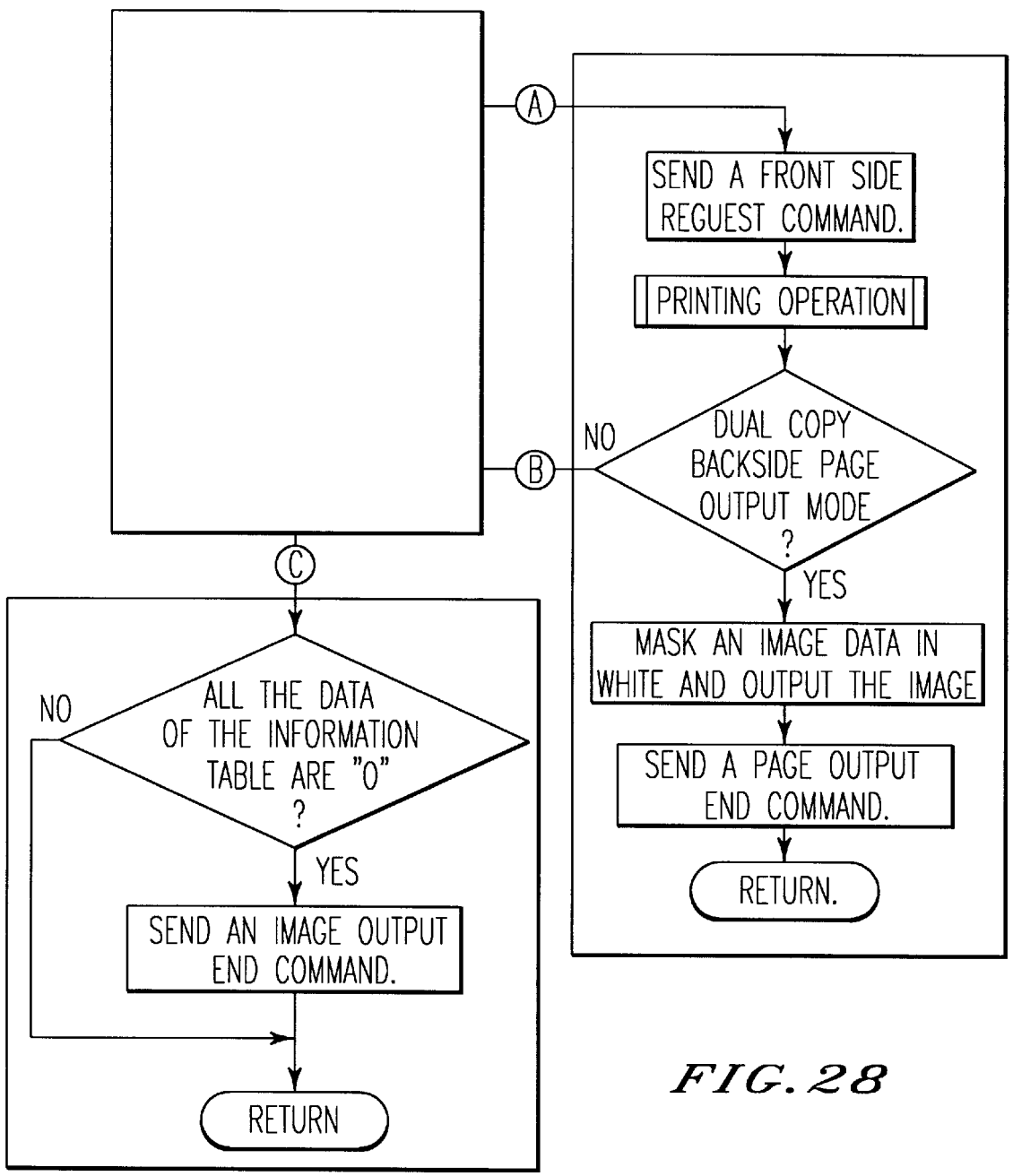
FIG. 28 is a flowchart showing an operation of the present invention of an image output process.
Figure 29:
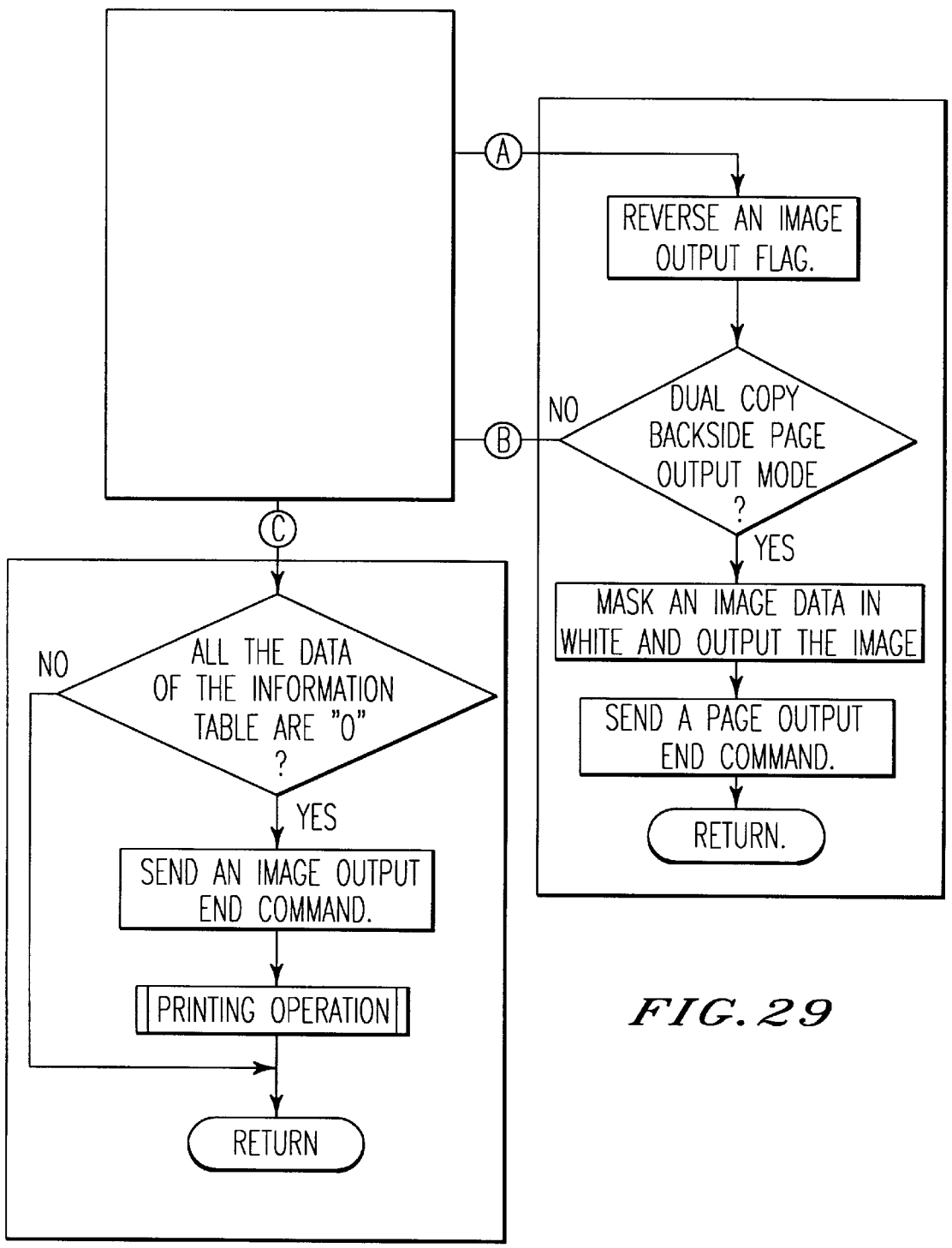
FIG. 29 is a flowchart showing an operation of the present invention of an image output process.

FIGS. 26 to 29 are flowcharts illustrating an image output process. FIGS. 27, 28 and 29 include a common part I which is the same as the flowchart shown in FIG. 26. In a case of a first image output, date information data is copied for an image output process on a temporary data area for processing in the RAM 170. Then, the temporary data area during an image output process is referred to for the date information. In a case that a page is not a first page, date information (shown in FIG. 19) which exists next to an original document page indicated by a variable "ppage" of the print page number is checked, then if data "255, 255, 255" is stored, the process proceeds to a date comparison process after adding 1 to "ppage". When date information next to "ppage" is other than 255, 255, 255, the process proceeds next to the process "copy date information in the temporary data area".

After copying date information data in the temporary data area, documents with the earliest date information are searched for in order of year, month and day. The search result of the document page numbers is stored in "ppage", and is then compared with date information of the document which has been most recently output. This operation in the present invention allows documents to be sorted based on the date information as the classification marks.

In FIGS. 27 and 29, if the date of the result is not the same, an image output flag is reversed. In FIG. 28, a front page request command is output, and then date data of the document which has finished outputting an image is printed. Next, if it is a back side output mode for a dual copy mode, image data is masked in white and output and then a page output end command is generated. If the date of the result is the same as a previous one or is in a front side copying mode for a dual copy mode, image data of "ppage" is output as an image in orientation indicated by an image output flag, and then a page output end command is generated. The date information of the document page in the "ppage" of the temporary data area is then cleared, and it is then determined if all date information is "0". If all the information is cleared, an image output end command is generated since this indicates that all document image data is output. In FIG. 29, then, date information of each document is, in the order of date, output on a paper sheet which is fed as a front page of each document.

Accordingly, with this operation it is possible to generate outputs which are sorted based on the order of date data.

An operation of the image forming apparatus will be further described with reference to the flowcharts of FIGS. 30 to 35 of a base engine control unit 20 (referred to as a BCU 20). Assume that in the first tray 109 as shown in FIG. 14, paper sheets are accommodated with the same size and orientation as an original document to be copied, and in the second tray 110 paper sheets with a different size, orientation or color from the original document are accommodated. A number of copies to be made is assumed to be one.

Figure 30:
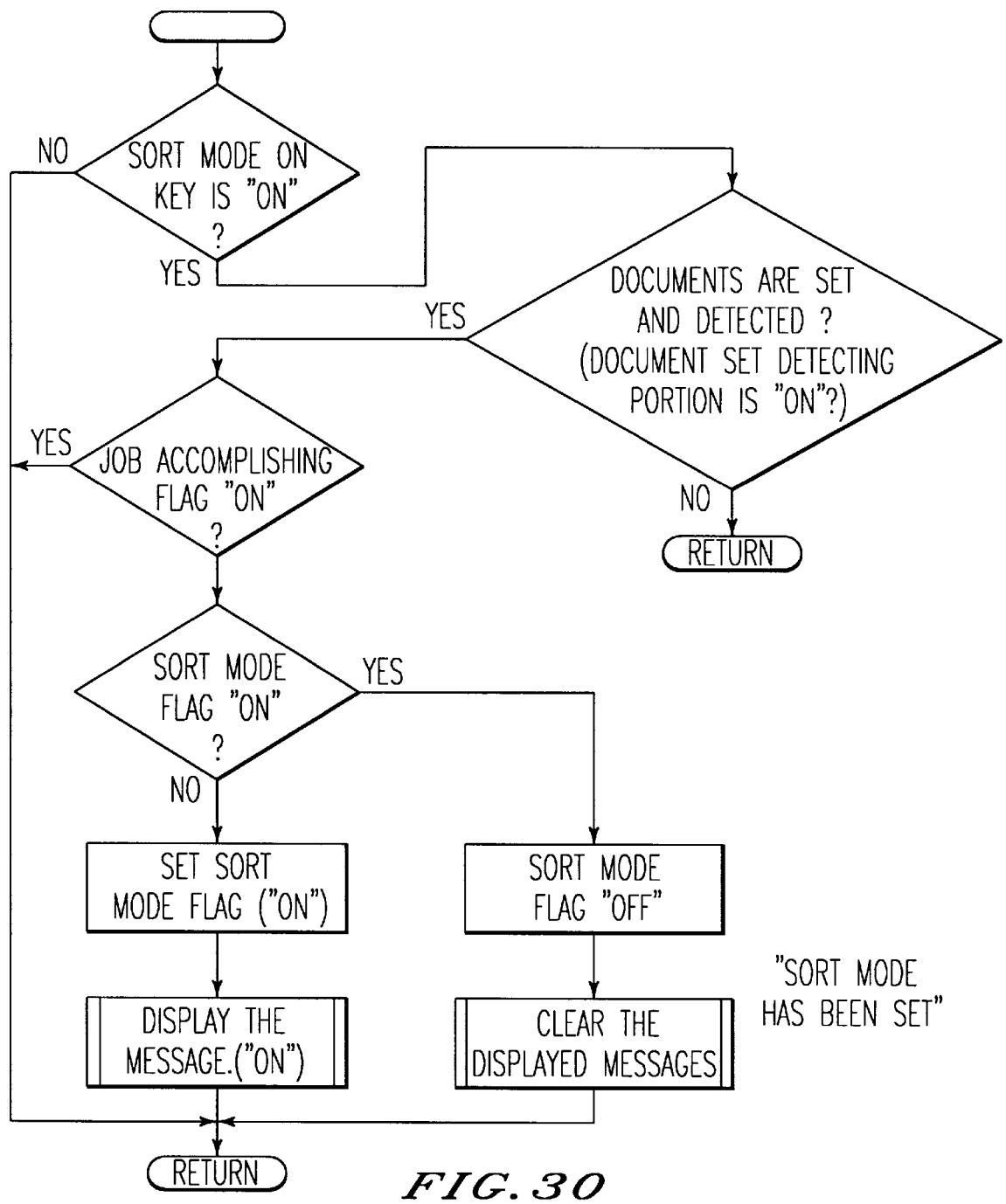
FIG. 30 is a flowchart illustrating an operation in the present invention in a case that a sort mode is set.

When a sort mode key 32 is depressed at a state in which the documents are placed on the document feeding portion 102, the key input is regarded as invalid if the image forming apparatus is working (a job accomplishing flag is "ON"), further the sort mode setting is cancelled if a sort mode has already been set. If the image forming apparatus is in a waiting mode and at a state in which a sort mode has not been set, a sort mode is set and a message of the sort mode is displayed as shown in FIG. 30. In a case that a sort mode has been set and documents on the document feeding portion 2 are removed or the mode clear key is pushed, the sort mode is cleared (not shown).

When the dual copy mode key on the operating panel 135 is pressed, a dual copy mode is set (a dual copy mode flag is "ON") if the image forming apparatus is in a waiting mode and at a state in which a dual copy mode has not been set, and then a message showing that the dual copy mode has been set is displayed. When a dual copy mode has already been set, the dual copy mode is cancelled. The dual copy mode is also cancelled by pressing the mode clear key 134 (not shown).

When the start key 129 is depressed, a sort mode command is sent to the IPU 149 if documents are set on the document feeding portion 102 and a sort mode is set, and then a transporting motor 126 of the ADF is turned on and a document is fed at a predetermined position on the contact glass 106. After feeding the document, a reading start command is sent to the IPU 149 and then image data is scanned. No key input is acceptable during a job operation (when an accomplishing flag is "ON").

Figure 32:
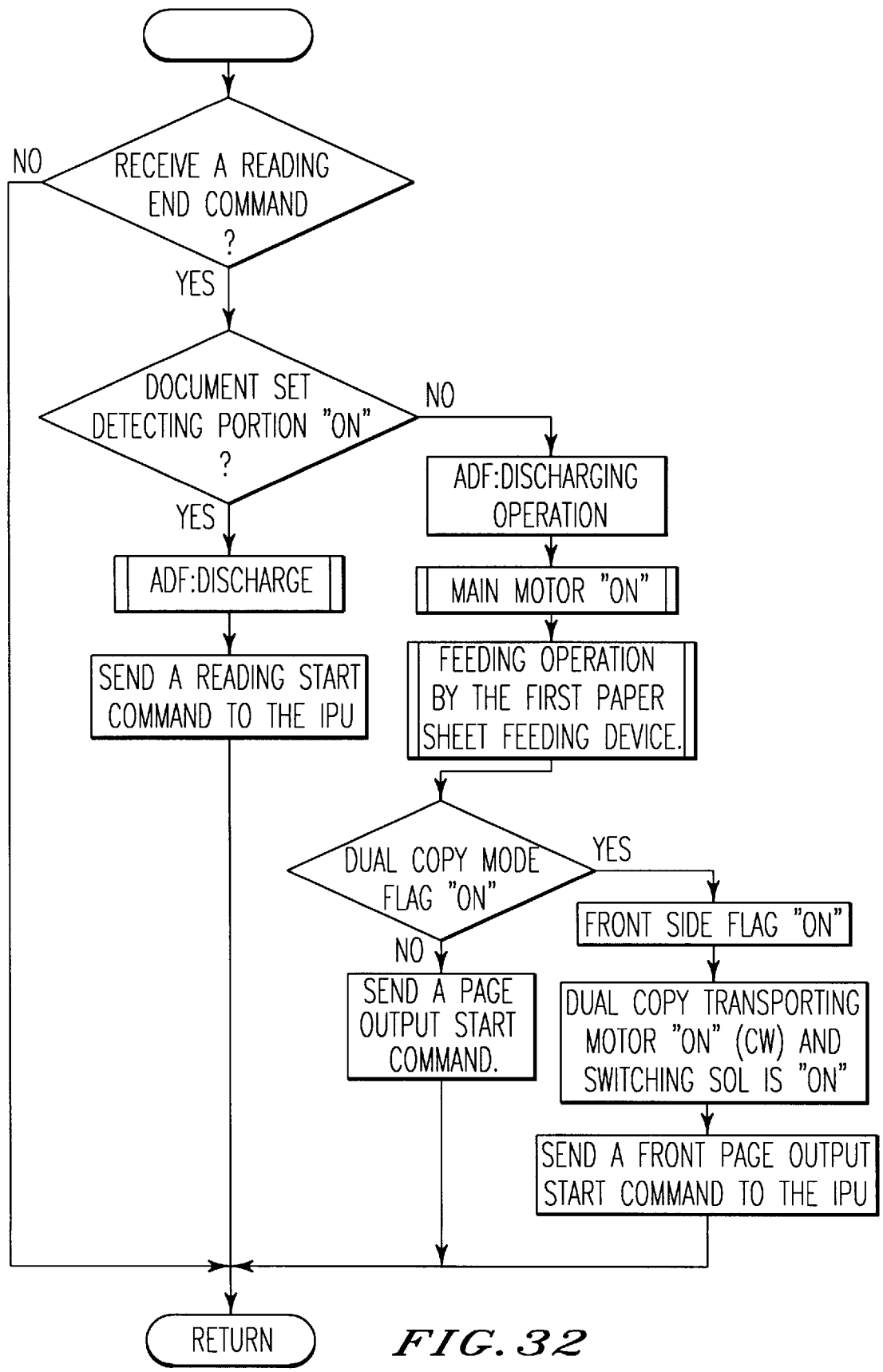
FIG. 32 is a flowchart illustrating an operation in the present invention in a case that a reading end command is received.

When a reading end command from the IPU 149 is received, the scanned document on the contact glass 106 is transported. Then, if there are still documents on the document feeding portion 102, a reading start command is sent to the IPU 149 after a document is fed to the predetermined position on the contact glass 106. If there is no document on the document feeding portion 102, the scanned document on the contact glass 106 is discharged, and then the main motor 125 is turned on and a paper sheet accommodated in the first tray 109 is fed by the first paper sheet feeding device 12 and is transported until the paper sheet is in contact with the photoconductive drum 115 by the vertical transporting unit 114. Then, if a dual copy mode has not been set, a page output start command is sent to the IPU 149, or if a dual copy mode has been set, a front side flag which shows a front side image to be formed is set and the dual copy transporting motor 122 is turned on by main controller 120, and then the switching solenoid SOL 138 is turned on and a front side output start command is sent to the IPU 149 as shown in FIG. 32.

In setting a dual copy mode, the writing unit 157 forms an image for a page of an original document on the photoconductive drum 115 when the IPU 149 receives the front side output start command. The image is transferred onto a paper sheet, and then the image transferred paper sheet is transported by the transporting belt 116 after fixing the image thereon in the fixing unit 117. The paper sheet with the fixed image is then transported and stacked in the dual copy tray 108 by the dual transporting unit 137 and the dual copy paper sheet feeding device 111. The dual transporting motor 122 is turned off when the paper sheet is stacked in the dual copy tray 108. In a case that a dual copy mode is not set, the IPU 149 receives a page output start command, the writing unit 157 forms an image for a page of the original document on the photoconductive drum 115, and then the image is transferred onto a paper sheet. The image transferred paper sheet is discharged via the transporting belt 116, the fixing unit 117 and the discharging unit 118.

In a case that the BCU does not receive an image output end command when receiving a page output end command from the IPU 149, if it is not in a dual copy mode, a paper sheet feeding operation is executed by the first paper sheet feeding device 112. The BCU sends a page output start command to the IPU 149. If it is in a dual copy mode and a front side flag is on, the front flag is removed and the switching solenoid SOL 138 is turned off.

Further, the dual copy paper sheet feeding device 111 feeds a paper sheet on which a front side image is formed in the dual copy tray 108, (the dual transporting motor 122 is turned on at CCW), and then a back side page output start command is sent to the IPU 149, and thereby the back side image is formed. If a front side flag is off, the front flag is set and the switching solenoid SOL 138 is turned on and a front side image is formed in the case shown in FIG. 32.

Figure 33:
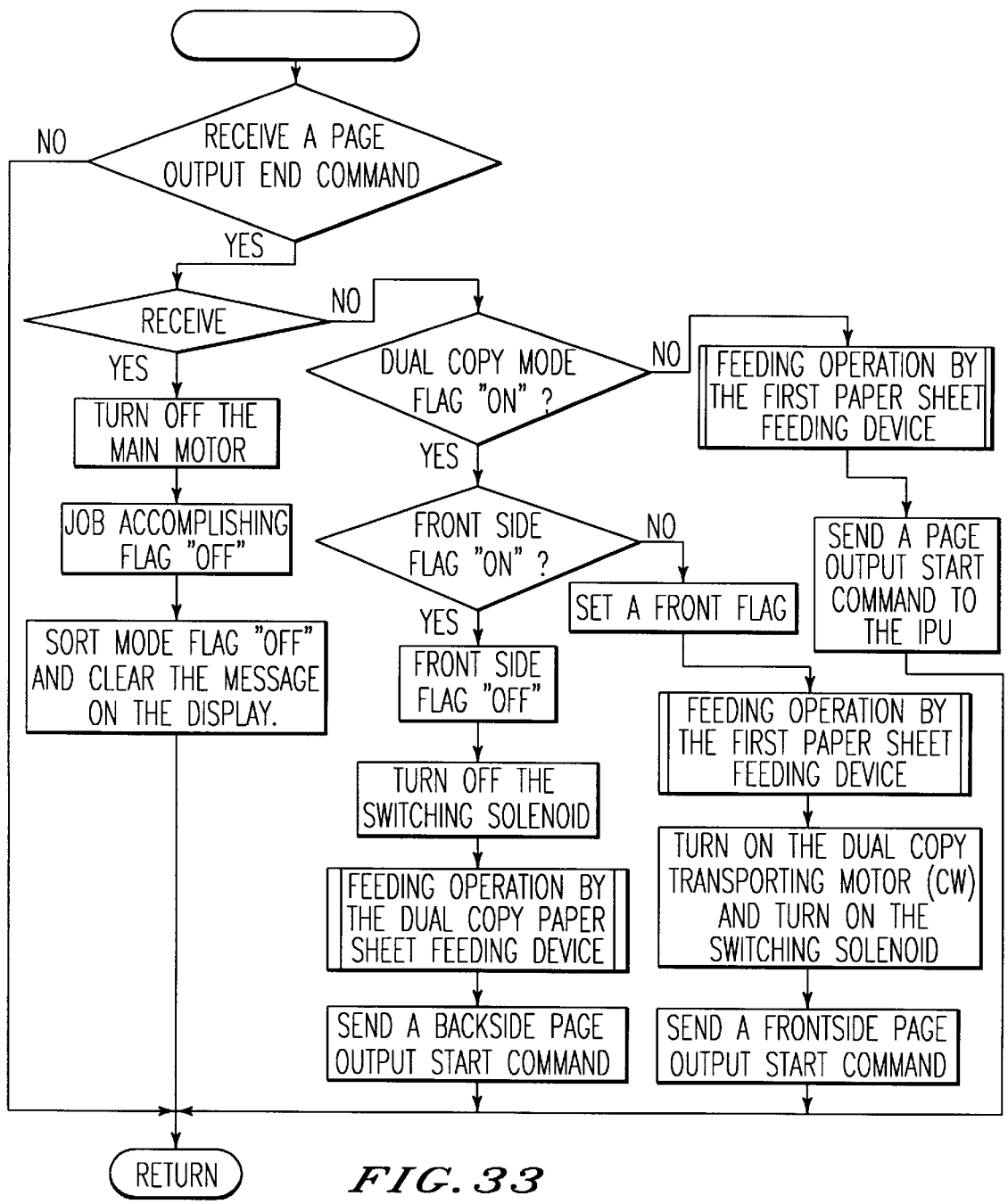
FIG. 33 is a flowchart illustrating an operation in the present invention in a case that a page output end command is received.
Figure 34:
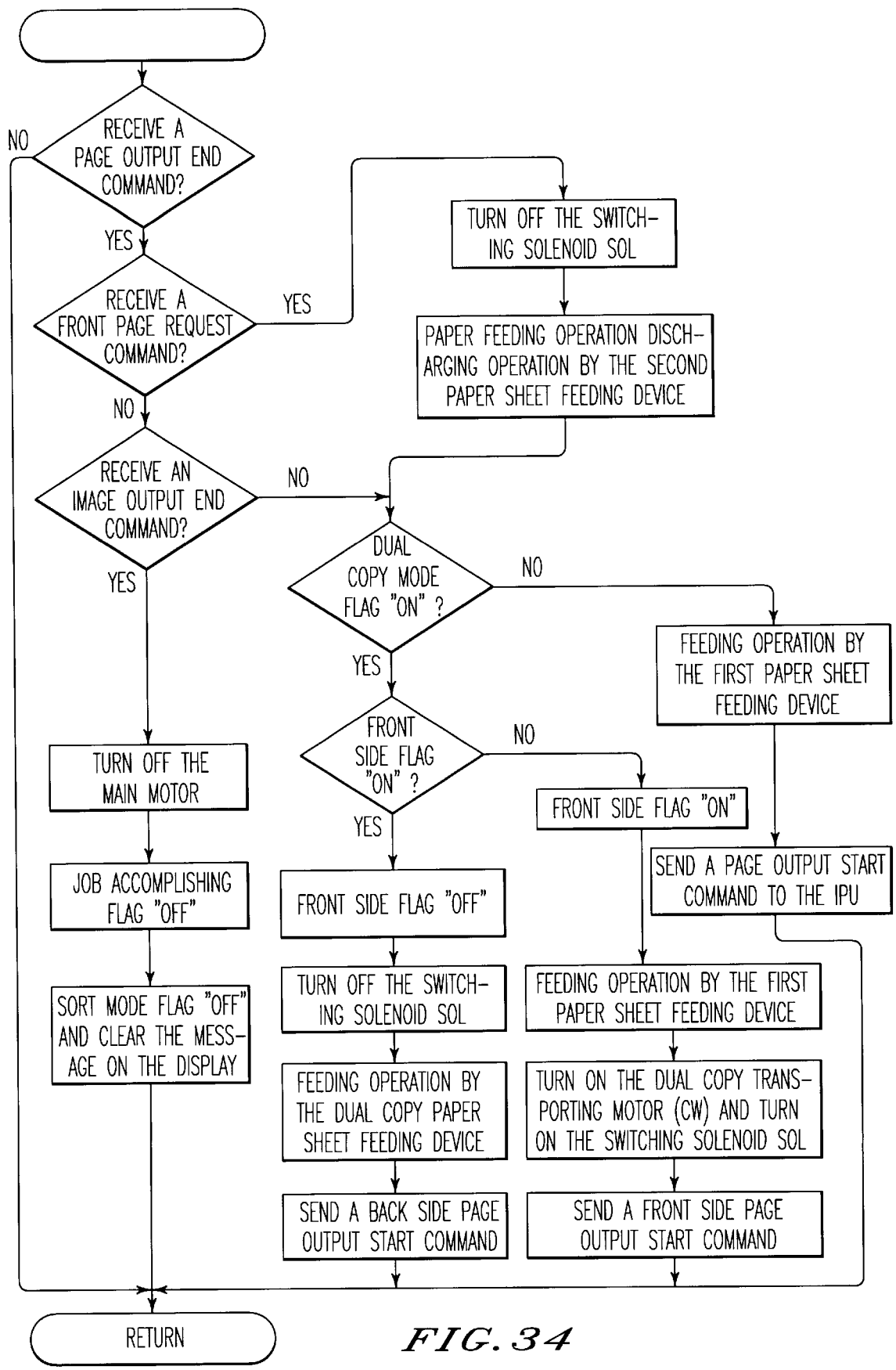
FIG. 34 is a flowchart illustrating an operation in the present invention in a case that a page output end command is received.

If the BCU receives an image output end signal, it is an indication that the image forming process has been executed on all the documents set on the document feeding portion 2, and then the main motor 125 is turned off, and a JOB accomplishing flag is removed and the sort mode flag is also off. Further, the message on the display is then cleared, and thereby the job (JOB) ends as shown in FIG. 33.

In a case that the BCU has received a front page request command when receiving a page output end command, then the switching solenoid SOL 138 is turned off, and then a paper sheet to be a front page which is accommodated in the second tray 10 is fed by the second paper sheet feeding device 113, on which data information of the document which has been copied is formed, and the copied paper sheet for the front page is discharged onto the paper sheet discharging tray 119. When it is not in a dual copy mode, the first paper sheet feeding device 112 feeds a paper sheet, and then the BCU sends a page output start command to the IPU 149.

In a case of a dual copy mode, a front side flag is removed if the front side flag is on and the switching solenoid SOL 138 is turned off. Then, the dual copy paper sheet feeding device 111 feeds the paper sheet on which the front side image is formed and which is accommodated in the dual copy tray 108 (the dual copy transporting motor is turned on at CCW).

Figure 31:
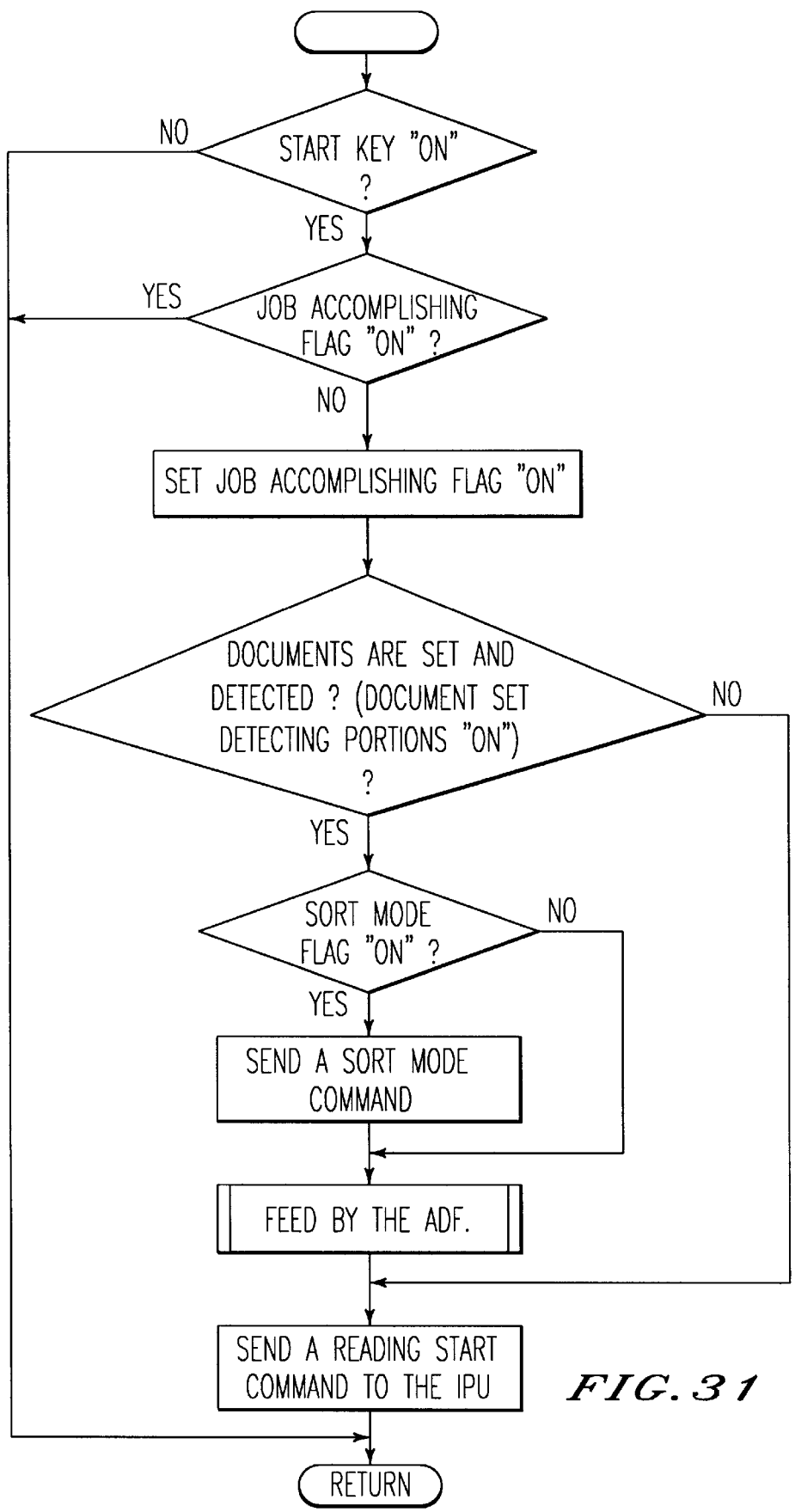
FIG. 31 is a flowchart illustrating an operation in the present invention in a case that a sort mode is set.

The BCU sends a back side page output start command, and thereby a back side image is formed. If a front side flag is off, the front side flag is set and the switching solenoid SOL 138 is turned on, and thereby a front side image is formed as shown in FIG. 31.

In a case that a front page request command has not been received, if image output end signals have not been received, the same operation as that after feeding and discharging a front page, as described above, is executed. If the image output end signal has been received, it is regarded that documents on the document feeding portion 102 have been copied, and thereby the main motor 125 is turned off, and then the JOB accomplishing flag is off and further the sort mode flag is off and the message of display is cleared and the job ends.

In a case that the BCU has not received an image output end command when receiving a page output end command, if it is not in a dual copy mode, the first paper sheet feeding device feeds a paper sheet and the BCU sends a page output start command to the IPU 149. In a case of a dual copy mode, if a front side flag is set, the front flag is removed and the switching solenoid SOL 138 is turned off, and then the dual copy paper sheet feeding device 111 feeds a paper sheet on which a front side image is formed (the dual copy transporting motor 122 is turned on at CCW). Then the BCU sends a back side page output start command to the IPU, and thereby a back side image is formed. If a back side flag is off, the back side flag is set and the switching solenoid SOL 138 is turned on, a front side image forming operation is carried out as well as FIG. 32.

Figure 35:
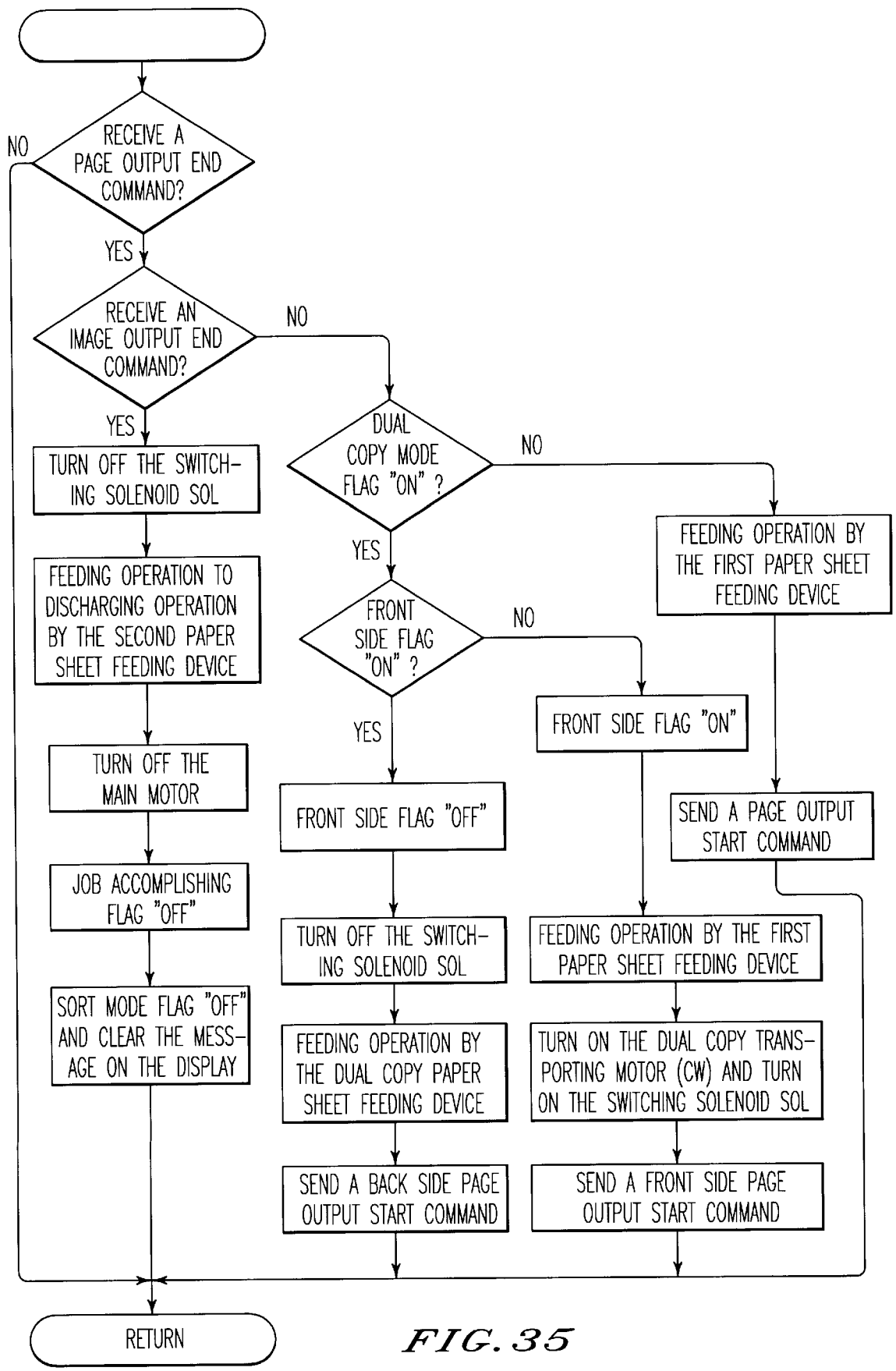
FIG. 35 is a flowchart an operation in the present invention in a case that a page output end command is received.

If an image output end signals have been received, it is regarded that all the documents on the document feeding portion 102 have been copied, and then the switching solenoid SOL 138 is turned off and the second paper sheet feeding device 103 feeds a paper sheet to be a front page, from the second tray 110, on which date information of each document is formed and the image formed paper sheet is discharged on the paper sheet discharging tray 119. Then main motor 125 is turned off, and the JOB accomplishing flag is removed and the sort mode flag is removed and display message is cleared, and thereby the job ends as shown in FIG. 35.

FIGS. 36(A) and 36(B) show a state in which paper sheets can be discharged on the paper sheet discharging tray 119.

More specifically, FIGS. 36(A) and 36(B) show how documents with different date information can be stacked as they are output on paper sheet discharging tray 119. As shown in FIG. 36(A), a first document which includes pages P.1–P.3 is first output, as this document has an oldest date information, and then a second document including further pages P.1 and P.2 is output, and third and fourth documents are then output. As a further feature of the present invention, and as is shown in FIG. 36(B), alternating documents can be oriented 90° apart from each other. The other orientation schemes shown in FIG. 12 of the present specification can also be implemented when the classification marks include the date information as shown in FIG. 36.

Obviously, numerous additional modifications and variations of the present invention are possible in light of the above teachings. It is therefore to be understood that within the scope of the appended claims, the present invention may be practiced otherwise than as specifically described herein.

The present application is based upon Japanese priority document 8-121391, which is incorporated herein by reference.

What is claimed as new and is desired to be secured by Letters Patent of the United States is:

1. An image forming apparatus comprising:

scanning means for scanning documents to be copied;

storing means for storing image data of the scanned documents to be copied and for storing classification marks on the scanned documents to be copied;

sorting means for outputting from the storing means the stored image data of the scanned documents to be copied in an order based on the stored classification marks for sorting output copies of the scanned documents to be copied based on the stored classification marks.

2. The image forming apparatus according to claim 1, wherein the classification marks include arbitrary characters.

3. The image forming apparatus according to claim 2, further comprising means for inserting a paper sheet between the sorted output copies of the scanned documents to be copied.

4. The image forming apparatus according to claim 3, wherein the inserted paper sheets include an indication of the classification marks.

5. The image forming apparatus according to claim 2, further comprising means for rotating an image by 180 degrees, and wherein the storing means rotates at least a portion of the output copies of the scanned documents by 180 degrees.

6. The image forming apparatus according to claim 2, further comprising means for rotating an image by 90 degrees, and wherein the sorting means rotates at least a portion of the output copies of the scanned documents by 90 degrees.

7. The image forming apparatus according to claim 1, wherein the classification marks include date information.

8. The image forming apparatus according to claim 1, further comprising means for inserting a paper sheet between the sorted output copies of the scanned documents to be copied.

9. The image forming apparatus according to claim 8, wherein the inserted paper sheets include an indication of the classification marks.

10. The image forming apparatus according to claim 1, further comprising means for rotating an image by 180 degrees, and wherein the storing means rotates at least a portion of the output copies of the scanned documents by 180 degrees.

11. The image forming apparatus according to claim 1, further comprising means for rotating an image by 90 degrees, and wherein the sorting means rotates at least a portion of the output copies of the scanned documents by 90 degrees.

12. The image forming apparatus according to claim 1, wherein the stored image data and stored classification marks are stored so as to be related to each other.

13. An image forming apparatus comprising:

a scanner scanning documents to be copied;

a memory storing image data of the scanned documents to be copied and storing classification marks on the scanned documents to be copied;

a sorter outputting from the storing means the stored image data of the scanned documents to be copied in an order based on the stored classification marks for sorting output copies of the scanned documents to be copied based on the stored classification marks.

14. The image forming apparatus according to claim 3, wherein the classification marks include arbitrary characters.

15. The image forming apparatus according to claim 4, further comprising an inserting unit inserting a paper sheet between the sorted document copies of the scanned documents to be copied.

16. The image forming apparatus according to claim 15, wherein the inserted paper sheets include an indication of the classification marks.

17. The image forming apparatus according to claim 14, further comprising a controller rotating an image by 180 degrees, and wherein the sorter rotates at least a portion of the output copies of the scanned documents of 180 degrees.

18. The image forming apparatus according to claim 14, further comprising a controller rotating an image by 90 degrees, and wherein the sorter rotates at least a portion of the output copies of the scanned documents by 90 degrees.

19. The image forming apparatus according to claim 13, wherein the classification marks include date information.

20. The image forming apparatus according to claim 13, further comprising an inserting unit inserting a paper sheet between the sorted output copies of the scanned documents to be copied.

21. The image forming apparatus according to claim 20, wherein the inserted paper sheets include an indication of the classification marks.

22. The image forming apparatus according to claim 13, further comprising a controller rotating an image by 180 degrees, and wherein the sorter rotates at least a portion of the output copies of the scanned documents by 180 degrees.

23. The image forming apparatus according to claim 13, further comprising a controller rotating an image by 90 degrees, and wherein the sorter rotates at least a portion of the output copies of the scanned documents by 90 degrees.

24. The image forming apparatus according to claim 13, wherein the stored image data and stored classification marks are stored so as to be related to each other.

\* \* \* \* \*